United States Patent [19]

Tsutsui et al.

[11] Patent Number: 5,739,677
[45] Date of Patent: Apr. 14, 1998

[54] VEHICLE POWER GENERATING SYSTEM

[75] Inventors: Toshio Tsutsui, Kariya; Hirohide Sato, Toyokawa, both of Japan

[73] Assignee: Nippondenso Co., Ltd., Kariya, Japan

[21] Appl. No.: 636,142

[22] Filed: Apr. 22, 1996

[30] Foreign Application Priority Data

Apr. 24, 1995 [JP] Japan .................... 7-098980

[51] Int. Cl.$^6$ ........................ H02P 9/00
[52] U.S. Cl. ................ 322/25; 322/20; 322/28; 322/36
[58] Field of Search ................ 322/25, 26, 27, 322/28, 29

[56] References Cited

U.S. PATENT DOCUMENTS

| | | | |
|---|---|---|---|
| 4,641,075 | 2/1987 | Asano et al. | 318/811 |
| 5,177,677 | 1/1993 | Nakata et al. | |
| 5,543,703 | 8/1996 | Kusase et al. | 322/16 |
| 5,550,457 | 8/1996 | Kusase et al. | 322/29 |
| 5,581,172 | 12/1996 | Iwatani et al. | 322/28 |

FOREIGN PATENT DOCUMENTS

| | | |
|---|---|---|
| 0 582 470 | 2/1994 | European Pat. Off. |
| 4-138030 | 5/1992 | Japan |
| 5-211752 | 8/1993 | Japan |

*Primary Examiner*—Thomas M. Dougherty
*Assistant Examiner*—Nicholas Ponomarenko
*Attorney, Agent, or Firm*—Cushman Darby & Cushman IP Group of Pillsbury Madison & Sutro LLP

[57] ABSTRACT

In a power generating system having an AC power generator, a quantity which is related to the state of power generation of the power generator and varies according to the supply of a leading phase current to the power generator, is detected. When the passage of the leading phase current through each armature winding is determined as necessary based on the detected status quantity, the leading phase current is supplied to each armature winding (an increase in the amount of supply of the leading phase current is included). If passage is determined as unnecessary, then the supply of the leading phase current to each armature winding is stopped (a decrease in the leading phase current is included). If so, then a change (improvement) in the state of power generation such as an increase in output or the like due to the above supply can be achieved by supplying the leading phase current thereto when its change is required. When the above change is unnecessary, the supply of the leading phase current thereto can be stopped to suppress a defective condition incident to the supply of the leading phase current thereto, particularly, the rate of change in output current, i.e., an increase in ripple. Owing to the above construction, the supply of the leading phase current to the power generator can be achieved by a simple circuit configuration and the state of power generation can be improved.

33 Claims, 22 Drawing Sheets

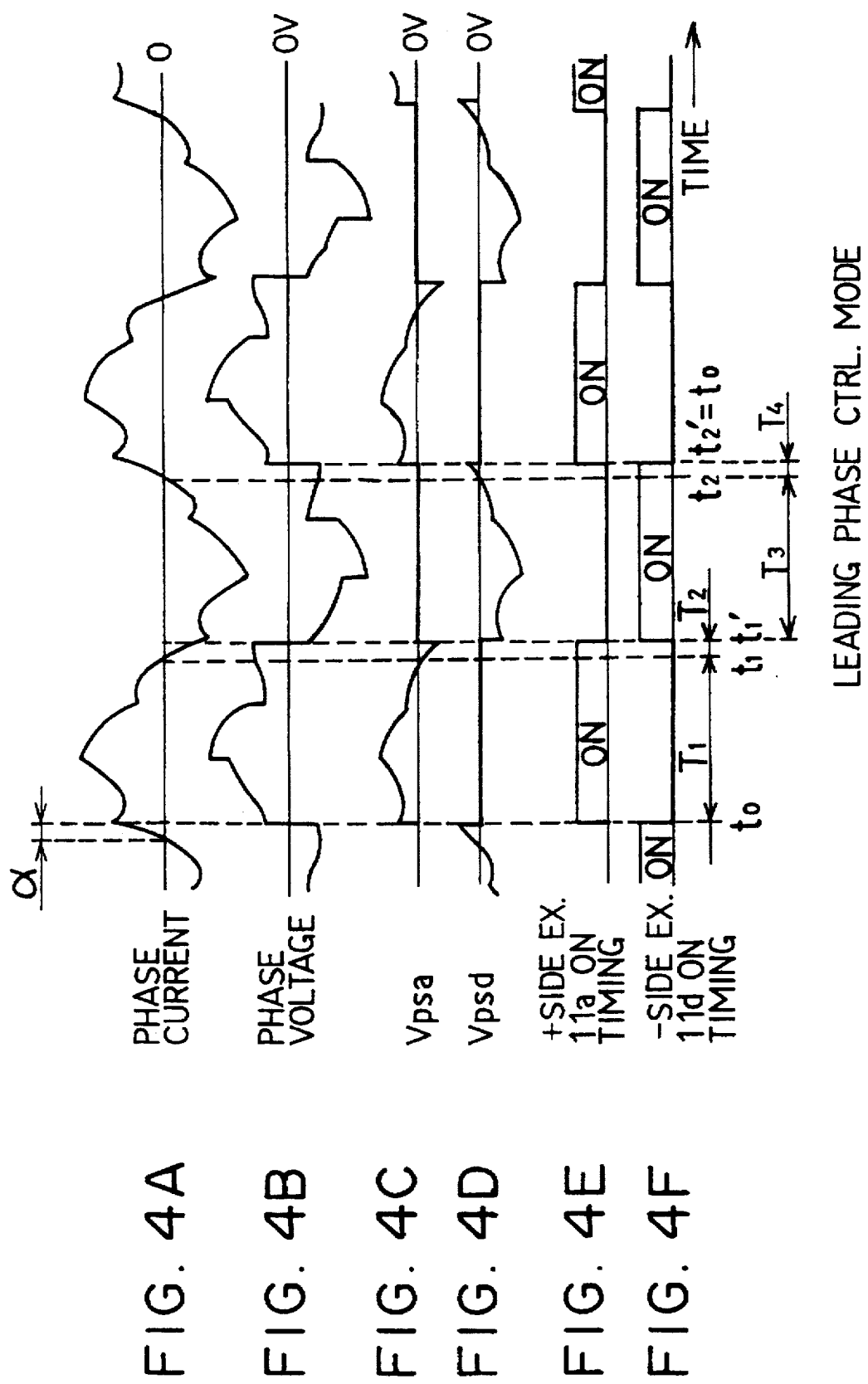

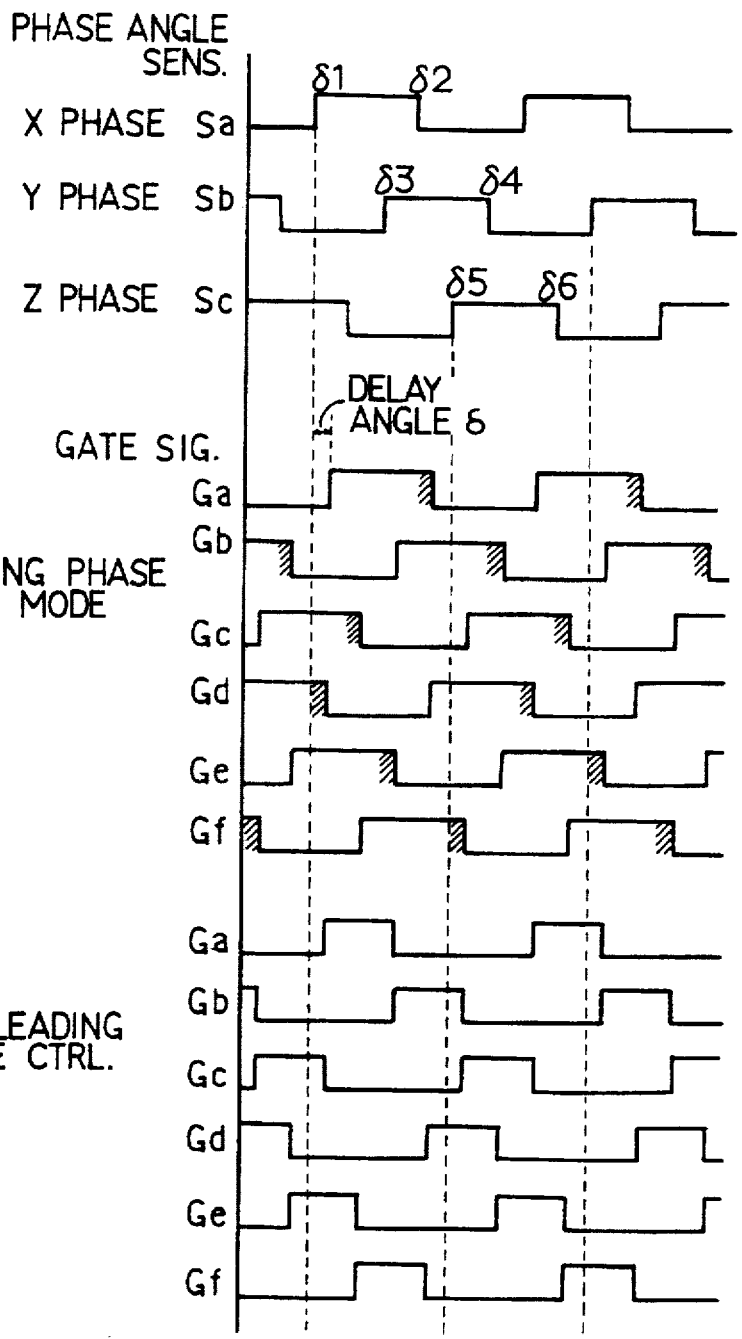

VEHICLE POWER GENERATING SYSTEM

CROSS-REFERENCE TO RELATED APPLICATION

The present application is related to and claims priority from Japanese Patent Application No. Hei. 7-98980, incorporated herein by reference.

BACKGROUND OF THE INVENTION

1. Field of the Invention

The present invention relates to a vehicle power generating system having a vehicle AC power generator, and particularly to a vehicle power generating system capable of controlling the supply of a leading phase current.

2. Description of Related Art

Japanese Patent Laid-Open No. 4-138030 discloses a vehicle power generating system for rectifying a current generated from a vehicle synchronous generator by a three-phase rectifying bridge circuit comprising semiconductor switching devices, each composed of a MOSFET, thereby charging a battery.

According to the above disclosure, the respective MOSFETs, which constitute the three-phase rectifying bridge circuit, are on-off controlled as follows: each of voltages (also called "phase voltages") applied to armature windings for respective phases is first compared with a battery voltage. Next, a high side switch of the phase for generating a potential higher than the battery voltage VB is turned on and a low side switch of the lower potential generating phase of the remaining two phases is turned on, whereby a battery charging current is drawn out.

It is known that output terminals of respective armature windings employed in a normal three-phase AC power generator are electrically connected to one another by leading-phase capacitors to supply leading phase currents to their corresponding armature windings, whereby lags produced in the armature currents are reduced to increase the output of the generator.

However, the vehicle power generating system according to the aforementioned disclosure has problems in terms of output, efficiency, vibrations, etc. Further, the aforementioned leading-phase current supplying system using the conventional leading-phase capacitors has a problem in that since the inductance of the power generator is large, the size of each capacitor is excessively increased due to the need for the increase in capacity of each leading-phase capacitor.

SUMMARY OF THE INVENTION

With the foregoing problems in mind, it is therefore an object of the present invention to provide a vehicle power generating system capable of supplying a leading phase current while preventing the system from increasing in size and complexity.

To solve the above problem, the present inventors have found that it is particularly advantageous when a switch is brought into conduction only during a predetermined period (also hereinafter called a "phase period") in one cycle or period so that a leading phase current is supplied to its corresponding armature winding, thereby making it possible to improve the state of power generation, e.g., the output, the efficiency, the vibrations, etc. However, the present inventors have also found that the rate of change in output current, i.e., the ripple, is greatly increased in the case of the supply of the leading phase current to its corresponding armature winding during such a specific phase period under the switch control.

It is another object of the present invention to improve the state of power generation by the supply of a leading phase current while suppressing a variation in output current.

The above objects are achieved in a first preferred embodiment of the present invention by providing a vehicle power generating system including an AC power generator having a field winding for generating field magnetic flux and armature windings for producing power-generating outputs and being drivable by an engine, an AC-DC power converting unit for rectifying a voltage outputted from each armature winding and supplying the rectified voltage to an electrical load, a field current control unit for controlling a field current supplied to the field winding, a voltage control unit for controlling the field current control unit to control each of the outputs produced from the AC power generator to a predetermined value, a state-of-power generation detecting unit for detecting a predetermined quantity of state of power generation related to a state of power generation of the AC power generator, a determining unit for determining, based on the detected quantity of state of power generation, whether the supply of a leading phase current to each armature winding is necessary, and a leading-phase current control unit for starting the supply of the leading phase current to each armature winding or increasing the leading phase current when the determining unit determines the leading-phase current supply as being necessary and stopping the supply of the leading phase current thereto or decreasing the leading phase current when the determining unit determines the leading-phase current supply to be unnecessary.

The supply of the leading phase current to each armature winding will mean an increase in the amount of supply of the leading phase current thereto. Further, the stop of the supply of the leading phase current thereto will mean a decrease in the amount of supply of the leading phase current thereto.

Preferably, when the quantity of state of power generation exceeds a predetermined first threshold value in the direction in which the supply of the leading phase current to each armature winding is necessary, the determining unit determines the supply of the leading phase current to each armature winding as being necessary. In either case, the quantity of state of power generation, which is related to the state of power generation of the power generator and varies according to the supply of the leading phase current to the power generator, is detected. When the passage of the leading phase current through each armature winding is determined as being necessary based on the detected status quantity, the leading phase current is supplied to each armature winding (the increase in the amount of supply of the leading phase current thereto is included). If determined as being unnecessary, then the supply of the leading phase current to each armature winding is stopped (the decrease in the leading phase current is included).

If so, then a change in the state of power generation such as an increase in output or the like due to the above supply can be achieved by supplying the leading phase current to each armature winding when its change is required. When the above change is unnecessary, the supply of the leading phase current thereto can be stopped to suppress a defective condition incident to the supply of the leading phase current thereto, particularly, the rate of change in output current, i.e., an increase in ripple. Namely, when the state of power generation is improved by the supply of the leading phase current to the armature winding while suppressing the change in output current, for example, the quantity of state of power generation is a physical quantity related to the capacity of the battery, and the capacity of the battery can be increased under the leading-phase current control if necessary.

Further, according to the present invention, the increase in ripple can be suppressed when the increase in output is unnecessary. On the other hand, when the increase in output is necessary, the output can be increased by supplying the leading phase current to the corresponding armature winding. Further, the body structure of the system having constant rated power can be reduced in size. Namely, since the leading phase current is supplied to the corresponding armature winding without a leading-phase capacitor, it is unnecessary to provide a large leading-phase capacitor. Therefore, the body structure of the system can be reduced in size. The body of the system can be made even smaller due to the following reasons.

Namely, since an output current greatly increases in a high-rpm region, the rating of the vehicle power generating system is defined based on a body structure for insuring a constant output current value in an idling speed region (low-rpm region) for providing the minimum generated voltage and output current. The leading-phase current supply according to the present invention can determine the following. Since the generated voltage is low in the idling speed region (low-rpm region) in the conventional power generator of non-leading phase system, the proportion of an output current carrying period per period or cycle is small. Therefore, the effect of extending the output current carrying period by the leading-phase current supply is found to be high in the idling speed region (low-rpm region). Namely, the effect of supplying the leading phase current during a period other than the output current carrying period through a semiconductor switching device to extend the output current carrying period and supplying the leading phase current to increase the output current during the output current carrying period is excellent in the low-rpm region. It is thus apparent that the body structure for obtaining a constant rated current by the supply of the leading phase current to each armature winding can be greatly reduced in size.

The leading-phase current supply and its control will be described below.

The leading phase current mentioned in the present invention shows an armature current that flows in the direction opposite to the direction of an armature voltage. By bringing a switch into conduction only during a predetermined period (also hereinafter called merely a "phase period") in one period of the armature current indicative of alternating current (AC), the corresponding armature winding is energized.

The leading phase current is supplied in the direction of flow into the armature winding during a predetermined period after an output current that flows out from the armature winding has been brought to 0. Further, the leading phase current is supplied in the direction of flow out from the armature winding during a predetermined period after a generated current that flows into the armature winding has been brought to 0. Incidentally, the predetermined period shows a period (phase period) from a first predetermined phase angular position to a second predetermined phase angular position in one period corresponding to an electrical angle of 2n of an antiphase armature current of an arbitrary phase.

When an AC voltage is supplied to the AC-DC power converting unit, a voltage obtained by rectifying the AC voltage becomes a certain value. Therefore, phase periods during which the potential at the high-potential DC power terminal of the AC-DC power converting unit exceeds the armature voltage and a phase period during which the potential at the low-potential DC power terminal of the AC-DC power converting unit falls below the armature voltage inevitably exist. Conventionally, these periods are those during which the armature current is not supplied.

The supply of the leading phase current to each armature winding during the aforementioned phase period unit that the current is supplied to precede or lead in phase the armature voltage during the above armature current non-carrying period that has inevitably occurred in the conventional AC-DC power converting unit (e.g., a three-phase full-wave rectifier). Therefore, field magnetic flux is increased because the leading phase current precedes in phase the armature voltage, thus resulting in an increase in generated voltage (armature voltage) and an increase in output.

A further description will be made of the case where the leading phase current is supplied through a three-phase inverter circuit corresponding to the AC-DC power converting means in the appended claims. The three-phase inverter circuit includes high side switches for respective phases, which connect output terminals for the respective phases and a high-potential DC power terminal, and low side switches for the respective phases, which connect the output terminals for the respective phases and a low-potential DC power terminal.

First, a phase current indicative of an antiphase current flows in the direction of flow into its corresponding armature winding only during the above predetermined time ($T_2$ shown in FIG. 5, for example).

When the antiphase current is not supplied, a phase voltage is normally a value larger than the voltage (0V in FIG. 1) at the low-potential DC power terminal at a time $t_1'$ when the predetermined time $T_2$ has elapsed. Thus, when the antiphase current is not supplied, the phase current (antiphase current) does not flow into the armature winding from the low-potential DC power terminal after the time $t_1'$.

However, when the antiphase current is caused to flow into its corresponding armature winding through the high side switch during the predetermined time $T_2$, a counter-electromotive force developed in each armature winding upon turning off the high side switch at the time $t_1'$ is produced in the direction of lowering the potential at the output terminal of the armature winding relative to the corresponding phase, i.e., the phase voltage relative to the corresponding phase. Thus, the phase voltage is reduced by the counterelectromotive force so that the phase voltage $V_a$ becomes lower than the potential at the low-potential DC power terminal. As a result, the antiphase current flows from the low-potential DC power terminal to the armature winding of the corresponding phase through a turned-on low side switch or a low side diode parallel-connected to the low side switch.

In other words, electromagnetic energy is stored in the armature winding by the antiphase current that does not flow upon non-supply of the antiphase current during the predetermined time $T_2$ and the electromagnetic energy is discharged after the time $t_1'$. The antiphase current that flows after the time $t_1'$, is actually recovered from the high-potential DC power terminal.

Further, the low side switch is cut off after a predetermined time delay since the time when the current flowing through the low side switch changes from the direction of flow into its corresponding armature winding to the direction of flow out therefrom. In doing so, the capability of power generation can be enhanced owing to the same operations and effects as those described above.

An experimental fact that the rate of change in output current, i.e., a ripple, increases due to the supply of the leading phase current will next be analyzed where the leading phase current is supplied by the three-phase inverter circuit corresponding to the AC-DC power converting means.

As described above, the leading phase current flows out from the armature winding of the given phase to the low-potential DC power terminal of the AC-DC power converting unit immediately before the current flows out from the output terminal (phase output terminal) of the armature winding of the phase to the outside through the high-potential DC power terminal of the AC-DC power converting unit. When the leading phase current is cut off by a semiconductor switching device (i.e., a low side switch) of the AC-DC power converting unit, an induced voltage (Ldi/dt) is produced in the armature winding so that the leading phase current is intended to abruptly flow out (rise) through a semiconductor switching device (high side switch) of the AC-DC power converting unit, which is turned on at this time. Namely, when the voltage produced in the armature winding is high, the rising edge of the output current that flows from the high side switch to the outside is rendered steep by the leading phase current pre-supplied to its corresponding armature winding. Similarly, when the voltage produced in the armature winding is low, the rising edge of the output current that flows into the corresponding armature winding through the low side switch, is rendered steep by the leading phase current pre-supplied to the armature winding, with the result that the aforementioned ripple is increased by the supply of the leading phase current to the corresponding armature winding.

Also, when the quantity of state of power generation further exceeds a second threshold value exceeding the first threshold value in the direction opposite to the direction in which the supply of the leading phase current to each armature winding is necessary, the determining unit determines the supply of the leading phase current to each armature winding as being unnecessary, and the leading phase current may be supplied when the quantity of state of power generation exceeds the predetermined first threshold value in the direction in which the supply of the leading phase current is necessary. In doing so, the control is simplified because so-called binary control based on the threshold value is executed. In doing so, hunting can be reduced because so-called binary control with hysteresis is executed.

Moreover, it is possible that the quantity of state of power generation includes an electrical status quantity composed of at least one of a battery voltage, a field current, the rate of power generation, a generated voltage, a load voltage, a generated current and a ripple ratio. In this way, the state of power generation of the power generator can be detected and controlled with ease and reliability.

It is possible that the quantity of state of power generation includes a velocity status quantity composed of at least one of the rotational speed of the power generator, the rotational speed of the engine and a vehicle speed. In this way, the state of power generation can be detected and controlled with ease and reliability.

Only when the supply of the leading phase current is determined as necessary from the result of decision based on the velocity status quantity and the supply of the leading phase current is determined as necessary from the result of decision based on the electrical status quantity, the leading phase current may be supplied. Thus, a problem can be avoided that when the state of rotation of the power generator is improper for the supply of the leading phase current, a leading-phase current carrying command is simply issued based on the electrical status quantity alone.

Further, when the rotational speed of the engine is determined as being less than a predetermined rotational speed, the determining unit may determine the engine as being in an idle state based on the quantity of state of power generation and when the engine is determined as being in an idle state, the determining unit determines the supply of the leading phase current to each armature winding as necessary. In this way, the state of power generation of the power generator can be detected and controlled with ease and reliability.

It is possible that only when the supply of the leading phase current is determined as necessary from the result of idle decision and the supply of the leading phase current is determined as necessary from the result of decision based on the electrical status quantity, the leading phase current may be supplied. Thus, the supply of the leading phase current at the time except when the power generator is at idle can be stopped.

Incidentally, the effect of increasing an output by the supply of the leading phase current is particularly excellent at low-rpms such as during idling. This is because since, at low-rpms such as at idling, the proportion of the phase period during which the armature voltage exceeds the potential at the high-potential DC power terminal is reduced within one period and the proportion of the leading-phase current carrying enable period other than the above is increased, and the generated voltage is low and the output (current) is small, the output increasing effect according to the present invention by the supply of the leading phase current is enhanced. Namely, the output increasing effect according to the present invention significantly appears at low-rpms such as at idling, that the generated voltage is raised by the supply of the leading phase current over the above period; particularly, the period prior to the above period, the period during which DC is outputted from an armature winding through the AD-DC power converting unit, is extended and the output current itself is also increased.

Thus, shortages in the output can be avoided by supplying the leading phase current at idle in which the output is originally low. Further, a variation in output current can be reduced at high-rpm in which the output is usually sufficient.

Moreover, it is possible that the system includes a detecting unit for detecting a physical quantity related to the rotational speed of the power generator, and the leading-phase current control unit determines a timing for supplying the leading phase current to each armature winding according to the rotational speed of the power generator detected based on the physical quantity.

Thus, the AC power generator for outputting DC through the AC-DC power converting unit has, in each phase, a period during which the armature voltage (phase voltage) becomes a potential lower than that at the high-potential DC power terminal of the AC-DC power converting unit and the period during which the armature voltage becomes the potential higher than that at the low-potential DC power terminal thereof and no current is outputted from each armature winding. Owing to the turning on of the switch selected for the need for the leading-phase current control, the leading phase current is caused to flow through the corresponding armature winding during these leading-phase current carrying enable periods. Since the time varies according to the rotational speed during these periods, a problem that the leading phase current is supplied during an unnecessary period can be solved by adjusting the current-carrying periods based on the quantity of state related to the rotational speed.

As an alternative to basing the decision of the current-carrying period on the rotational speed, the maximum value of the current-carrying period may be decided.

Further, it is possible that the leading-phase current control unit starts the supply of the leading phase current to each armature winding in leading-phase current carrying timing in which one of the efficiency and output of the power generator at the time that the rotational speed of the engine is a predetermined value becomes greater than or equal to a predetermined value. In this way, improvements in output and efficiency can be achieved and control can be simplified.

Incidentally, the leading-phase current carrying condition (e.g., the current-carrying timing) for maximizing the effect of improving the output by the supply of the leading phase current differs from the leading-phase current carrying condition for maximizing the effect of enhancing the efficiency by the supply of the leading phase current. The leading-phase current carrying period during which an increase in efficiency becomes highest is normally shorter than the leading-phase current carrying period during which an increase in output is maximized.

Moreover, it is possible that the leading-phase current control unit starts the supply of the leading phase current to each armature winding at a leading-phase current carrying timing in which one of the efficiency and output of the power generator at the time that the rotational speed of the engine is a predetermined idling engine speed (e.g., 500–1000 rpm) becomes greater than or equal to the predetermined value.

Further, the leading-phase current control unit may have a high-efficiency power generation mode indicative of a leading-phase current control mode under a leading-phase current carrying condition in which the efficiency of the power generator becomes greater than or equal to the predetermined value, and a high-output power generation mode indicative of the leading-phase current control mode under a leading-phase current carrying condition in which the output of the power generator becomes greater than or equal to the predetermined value, where the determining unit selects one of both modes based on the quantity of state of power generation when the supply of the leading phase current to each armature winding is determined as being necessary. In this way, high output can be obtained when high output is needed. When high output is unnecessary, high efficiency can be obtained.

As described above, the leading-phase current carrying condition (e.g., the current-carrying timing) for maximizing the effect of improving the output by the supply of the leading phase current is different from the leading-phase current carrying condition for maximizing the effect of enhancing the efficiency by the supply of the leading phase current. In general, the leading-phase current carrying period during which the increase in efficiency is rendered highest is shorter than the leading-phase current carrying period during which the increase in output is brought to the maximum.

It is thus determined based on the quantity of state of power generation whether the output leaves a margin of safety. If it is determined that the output leaves such a margin, then the leading-phase current carrying condition is shifted from the high-output side to the high-efficiency side. If it is determined that the output lacks such a margin, then the leading-phase current carrying condition is shifted from the high-efficiency side to the high-output side. As a result, the aforementioned operations and effects can be achieved.

It is also possible that the quantity of state of power generation includes a battery voltage and the determining unit determines the supply of the leading phase current to each armature winding as being necessary when the battery voltage is lower than a predetermined first voltage value and determines the leading-phase current supply as being unnecessary when the battery voltage is higher than a predetermined second voltage value including the predetermined first voltage value. In this way, the battery voltage can be controlled to a desired level under the leading-phase current control. This can bring about an advantage that the above control can be quickly done owing to the control of the field current. The range of output control can be also increased in combination with the field current control.

The leading-phase current control unit may limit the maximum value of the rate of change in leading phase current so as to gradually change the leading phase current; limit the maximum value of the rate of change in at least one of a leading-phase current carrying period, the phase of the carrying leading-phase current relative to each phase voltage and the average of the leading phase currents supplied to the armature windings thereby to gradually change the leading phase current; or restrict the maximum value of the rate of change in proportion of a leading-phase current carrying period per predetermined period in which the armature currents are continuous relative to each other thereby to gradually change the leading phase current.

Still further, the leading phase current may be gradually varied, i.e., the leading phase current may be varied at the predetermined maximum rate of increase in current or the predetermined maximum rate of decrease in current or less.

In this way, the load torque of the power generator can be prevented from suddenly increasing according to the supply or non-supply of the leading phase current. Further, a mechanical shock applied to the engine can be reduced and a change and increase in the rotational speed of the engine can be suppressed.

It is possible that the quantity of state of power generation includes a physical quantity related to at least one of an output voltage drop at the time of an increase in the electrical load supplied with power from the power generator and a reduction in the rotational speed of the power generator and that the determining unit determines the gradual change in and supply of the leading phase current as being necessary when at least one of the output voltage drop and the reduction in the rotational speed of the power generator is determined as larger than the other based on the physical quantity. In this way, the leading-phase current carrying control can be rapidly performed without the gradual change when the change in load torque is small.

It is also possible that the quantity of state of power generation includes a physical quantity related to a variation in the rotational speed of the engine, and that the determining unit determines the leading-phase current supply as necessary when the variation is determined as large based on the physical quantity and the leading-phase current control unit suppresses the variation in the rotational speed of the engine under the control for the supply of the leading phase current when the leading-phase current supply is determined as necessary.

Thus, a change in the rotational speed of the engine is suppressed under the leading-phase current control in a physical condition (e.g., at idle) under which the rotational speed of the engine is determined as being high.

Namely, when the rotational speed of the engine is high, the leading phase current is supplied to increase the engine load, whereas when the rotational speed of the engine is low, the supply of the leading phase current is stopped to reduce the engine load. It is therefore possible to easily and quickly suppress the change in the rotational speed.

It is still further possible that the quantity of state of power generation includes a physical quantity related to vibrations created by the engine, that the determining unit determines the leading-phase current supply as being necessary when the vibrations are determined as large based on the physical quantity, and that the leading-phase current control unit suppresses the engine vibrations under the control for the supply of the leading phase current when the leading-phase current supply is determined as necessary.

Thus, the vibrations created by the engine can be suppressed under the leading-phase current control in a physical condition (e.g., at idle) under which it is determined that the engine greatly vibrates.

Namely, the leading-phase current control is executed in the direction of suppressing the vibrations at a frequency the same as the waveform (whose fundamental frequency in particular) of the engine vibrations. Incidentally, the engine vibrations include rotational vibrations, reciprocating vibrations and vibrations obtained by combining these vibrations. However, any of the vibrations may be controlled.

It is also possible that the quantity of state of power generation includes a physical quantity related to the temperature of a predetermined portion of the power generator, that the determining unit determines based on the physical quantity whether the power generator has a low temperature, and that the leading-phase current control unit stops the supply of the leading phase current to each armature winding and reduces the leading phase current when the power generator is determined to be low in temperature and starts the supply of the leading phase current to each armature winding and increases the leading phase current when the power generator is determined to be in a non-low temperature state.

Thus, when the power generator is low in temperature, the supply of the leading phase current is stopped. Namely, when the power generator is at a low temperature, the resistance of each winding employed in the power generator is low and the output is increased under the same physical conditions as compared with the generator at a high temperature. It is thus possible to prevent the output current from flowing beyond expectations or need and prevent the engine load from becoming heavy.

It is possible that the leading-phase current control unit includes a normal/reverse energization opening/closing circuit having high side switches respectively composed of semiconductor switching devices for individually connecting a high-potential DC power terminal and output terminals of the armature windings for respective phases and low side switches respectively composed of semiconductor switching devices for individually connecting a low-potential DC power terminal set to a potential lower than that at the high-potential DC power terminal and the output terminals of the armature windings, and a controller for controlling the normal/reverse energization opening/closing circuit.

In this way, the leading-phase current control unit can be simply constructed. Particularly, when the normal/reverse energization opening/closing circuit doubles as the AC-DC power converting unit, the circuit configuration can be further simplified.

Also, it is possible that the leading-phase current control unit includes a short-circuiting circuit composed of a plurality of semiconductor switching devices for short-circuiting between the output terminals of the armature windings for the respective phases and a controller for controlling the opening and closing of each semiconductor switching device. In this way, the leading-phase current control unit can be simply constructed.

It is further possible that the detecting unit for detecting a difference in potential between at least one of the high-potential DC power terminal and the low-potential DC power terminal of the AC-DC power converting unit and the output terminal of each armature winding and at least one of the armature currents is provided and the leading-phase current control unit sets a timing for opening and closing each semiconductor switching device based on at least one of the potential difference and at least one armature current. In this way, it is then unnecessary to provide a turning-angle sensor, i.e., an absolute type rotary encoder. As a result, the system structure can be simplified.

It is possible that each semiconductor switching device incorporates therein a current detection resistive element for detecting the armature current; for example, the current detection resistive element for detecting each armature current may be integrated into an IC chip with the semiconductor switching devices integrated therein to simplify the system structure.

It is also possible that the controller turns off each high side switch after a predetermined period has elapsed since a potential at the output terminal of each armature winding has become less than a potential at the high-potential DC power terminal and turns off each low side switch after a predetermined period has elapsed since the potential at the output terminal of each armature winding has become greater than a potential at the low-potential DC power terminal. Thus, the leading phase current can be cut off at an optimum timing with ease and reliability.

It is further possible that the controller turns on each high side switch after a predetermined period has elapsed since the potential at the output terminal of each armature winding has become greater than the potential at the low-potential DC power terminal and turns on each low side switch after a predetermined period has elapsed since the potential at the output terminal of each armature winding has become less than the potential at the high-potential DC power terminal.

Moreover, it is possible that each low side switch is turned on after the predetermined period has elapsed since the potential at the output terminal of each armature winding has become less than the potential at the high-potential DC power terminal (i.e., after the armature current has been inverted) and each high side switch is turned on after the predetermined period has elapsed since the potential at the output terminal of each armature winding has become greater than the potential at the low-potential DC power terminal (i.e., after the armature current has been reversed). The leading phase current can be supplied in optimum timing with ease and reliability if done in this way.

Particularly, when the high side switch and the low side switch identical in phase to each other are reverse-operated, the armature winding for each phase is always electrically connected to either the high side switch or the low side switch. Thus, a large counterelectromotive force at the time of cutoff of either the high side switch or the low side switch can be prevented from being applied to the corresponding semiconductor switching device as a surge voltage.

It is also possible that the controller turns on the semiconductor switching devices of the short-circuiting circuit for allowing the leading phase current to flow in each armature winding after the potential at the output terminal of each armature winding has become less than the potential at the high-potential DC power terminal, turns on the semiconductor switching devices of the short-circuiting circuit for allowing the leading phase current to flow out from each armature winding after the potential at the output terminal of each armature winding has become greater than the potential at the low-potential DC power terminal and turns off the semiconductor switching devices of the short-circuiting circuit after a predetermined time has elapsed since the turning-on.

Thus, the leading phase current can be turned on and off in optimum timing with ease and reliability.

The system may also include a phase angle detecting unit for detecting a rotational phase angle of a rotor of the AC power generator, where the leading-phase current control unit controls the opening and closing timing of each semiconductor switching device based on the rotational phase angle. In this way, the leading phase current can be turned on and off at an optimum timing with reliability.

Each semiconductor switching device may include a MOSFET. Since the MOSFET is able to provide bidirectional energization, the semiconductor switching device can be constructed of a single element. Since the MOSFET incorporates a pair of parasitic junction diodes between one of the source and drain thereof and a well region in particular, an advantage occurs in that if one of the pair of junction diodes is short-circuited upon application to each high side switch or each low side switch of the normal/reverse energization opening/closing circuit, then an excessive current can be shunted by the other diode.

The MOSFET may include SiC as a material. Since SiC has a high withstand voltage and a low on-resistance, a reduction in loss and an increase in voltage can be achieved.

The above objects are achieved according to another aspect of the invention by providing a vehicle power generating system including an AC power generator having a field winding for generating field magnetic flux and armature windings for producing power-generating outputs and driven by an engine, a field current control unit for controlling a field current supplied to the field winding, a voltage control unit for controlling the field current control unit to control each of the outputs from the AC power generator to a predetermined value, and a leading-phase current control unit for controlling the supply of a leading phase current to each armature winding, where the leading-phase current control unit limits the maximum value of the rate of change in leading phase current to gradually change the leading phase current.

In this way, it is possible to prevent an abrupt change in load torque of the power generator incident to the supply or non-supply of the leading phase current, reduce a mechanical shock applied to the engine and suppress an increase in variations in the rotational speed of the engine.

The above objects are achieved according to a further aspect of the invention by providing a vehicle power generating system including an AC power generator having a field winding for generating field magnetic flux and armature windings for producing power-generating outputs and driven by an engine, a field current control unit for controlling a field current supplied to the field winding, a voltage control unit for controlling the field current control unit to control each of outputs produced from the AC power generator to a predetermined value, a detecting unit for detecting a physical quantity related to a variation in the rotational speed of the engine, a leading-phase current control unit for controlling the supply of a leading phase current to each armature winding, and a determining unit for determining the magnitude of the variation in the rotational speed of the engine based on the physical quantity, whereby the leading-phase current control unit supplies the leading phase current to each armature winding when the variation is determined to be large.

Thus, a change in the rotational speed of the engine is reduced under the control of the leading phase current. Namely, when the rotational speed of the engine is high, the leading phase current is supplied to increase the engine load. On the other hand, when the rotational speed of the engine is low, the supply of the leading phase current is stopped to lighten the engine load. As a result, the rotational speed of the engine can be easily and quickly prevented from varying.

The above objects are achieved according to still another aspect of the invention by providing a vehicle power generating system including an AC power generator having a field winding for generating field magnetic flux and armature windings for producing power-generating outputs and driven by an engine, a field current control unit for controlling a field current supplied to the field winding, a voltage control unit for controlling the field current control unit to control each of outputs produced from the AC power generator to a predetermined value, a detecting unit for detecting a physical quantity related to vibrations created by the engine, a leading-phase current control unit for controlling the supply of a leading phase current to each armature winding, and a determining unit for determining the magnitude of the engine variations based on the physical quantity, whereby the leading-phase current control unit supplies the leading phase current to each armature winding when the vibrations are determined as large.

In this way, vibrations created by the engine are reduced under the control of the leading phase current. Namely, the leading phase current is controlled in the direction of suppressing the vibrations at the same frequency as that (particularly, fundamental frequency) of a detected and estimated engine vibrating waveform. Incidentally, the engine vibrations include rotational vibrations, reciprocating vibrations and vibrations obtained by combining them. However, any of them may be controlled.

The above objects are achieved according to yet another aspect of the present invention by providing a vehicle power generating system including an AC power generator having a field winding for generating field magnetic flux and armature windings for producing power-generating outputs and driven by an engine, a field current control unit for controlling a field current supplied to the field winding, a voltage control unit for controlling the field current control unit to control each of outputs produced from the AC power generator to a predetermined value, a detecting unit for detecting a physical quantity related to the temperature of a predetermined portion of the AC power generator, a leading-phase current control unit for controlling the supply of a leading phase current to each armature winding, and a determining unit for determining based on the physical quantity whether the AC power generator is at a low temperature, whereby the leading-phase current control unit stops the supply of the leading phase current to each armature winding and reduces the leading phase current when the AC power generator is determined as low in temperature and starts the supply of the leading phase current to each armature winding and increases the leading phase current when the AC power generator is determined as being at a non-low temperature.

Thus, an output excessively-producing phenomenon at a low temperature is suppressed under the control of the leading phase current in the vehicle power generating system having the AC power generator.

Namely, when the power generator is at a low temperature, the resistance of each winding employed in the power generator is low and the output is increased under the same physical condition as compared with at a high temperature. It is thus possible to prevent the output current from flowing beyond expectations or need due to the stop of the supply of the leading phase current at the low temperature and prevent the engine load from becoming heavy.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 4A–4F are timing charts for describing the waveforms of a phase current and a phase voltage and opening/closing timings of the MOSFETs 11a and 11d at the time of control of a leading phase current by the vehicle power generating system shown in FIG. 1;

FIGS. 9A–9O are timing charts for describing the relationship between phase angles and the phases of gate signals at the time of control of non-leading phase and leading phase currents by the vehicle power generating system shown in FIG. 8;

DETAILED DESCRIPTION OF THE PRESENTLY PREFERRED EXEMPLARY EMBODIMENTS

An overall configuration of a vehicle power generating system according to the present invention will hereinafter be described with reference to the block diagram shown in FIG. 1.

Figure 1:
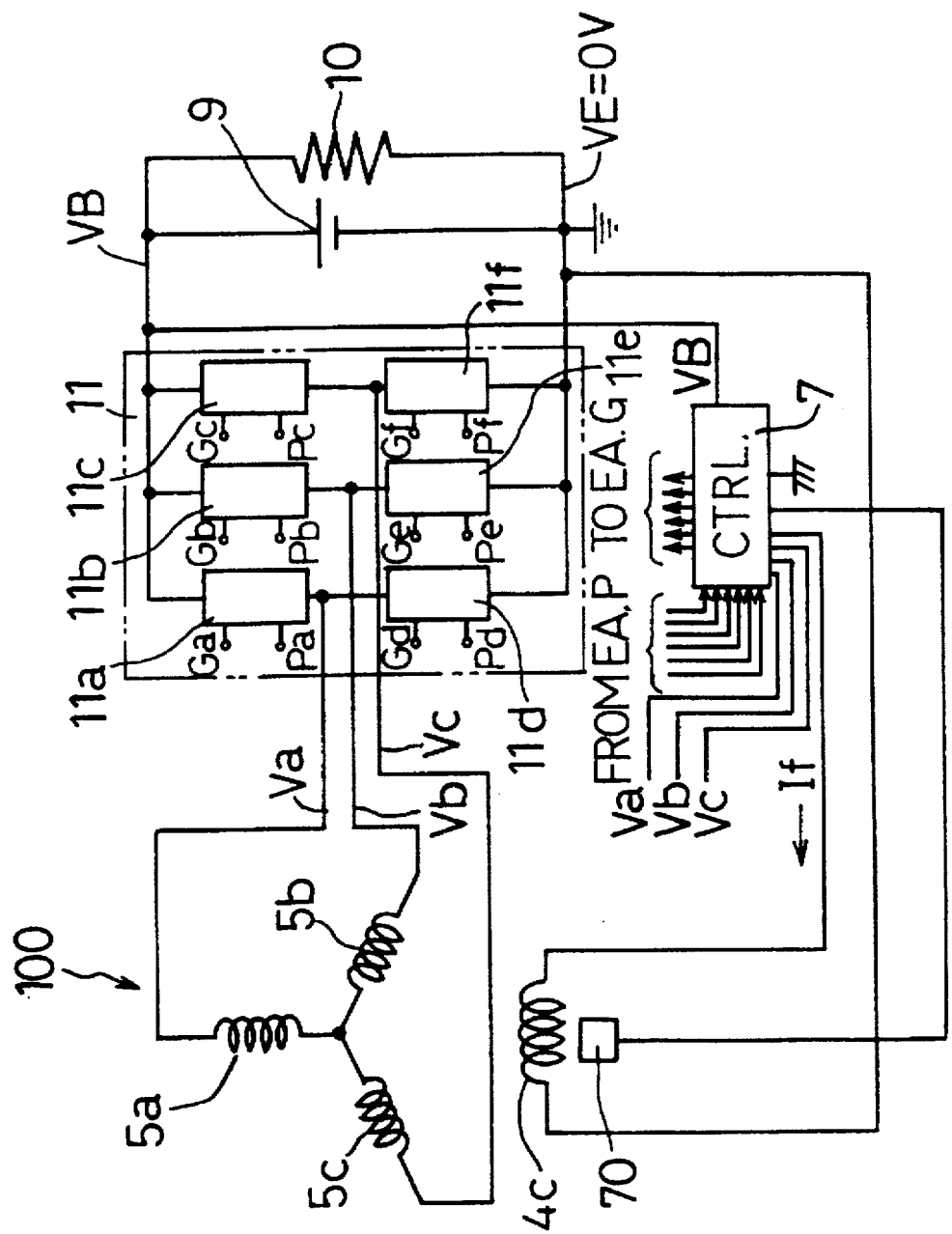
FIG. 1 is a circuit diagram for explaining an overall configuration of a system according to the present invention.

As shown in the block diagram of FIG. 1, the vehicle power generating system includes a three-phase synchronous generator (e.g., an AC power generator) 100, a three-phase full-wave rectifier (corresponding to the AC-DC power converting means and opening/closing energization opening/closing circuit as recited in the appended claims) 11 for rectifying AC current generated by the three-phase synchronous generator 100, and a controller 7. The three-phase full-wave rectifier 11 and the controller 7 constitute a determining means and a leading phase current supplying means as recited in the appended claims.

A current generated in each of armature coils 5a through 5c is rectified by the three-phase full-wave rectifier 11. A field current passing through a field coil 4c is controlled by the controller 7. When the field coil 4c through which the field current is passed is rotated, a three-phase AC voltage is induced in the armature coils 5a through 5c.

The three-phase full-wave rectifier 11 comprises an inverter circuit of a type wherein MOSFETs 11a through 11f each composed of SiC are provided in the form of a three-phase bridge connection. A high-potential DC output terminal of the three-phase full-wave rectifier 11 is electrically connected to a high-potential terminal of a battery 9 and one terminal of an electrical load 10, and a low-potential DC output terminal thereof is electrically grounded together with a low-potential terminal of the battery 9 and the other end of the electrical load 10.

The controller 7 is implemented using a microprocessor and controls the conductivity of a field current If using pulse width modulation (PWM) techniques so that a battery voltage VB matches a predetermined generated voltage. Further, the controller 7 generates gate voltage signals Ga through Gf based on voltage drop signals Pa through Pf to be described later, which are individually inputted from their corresponding Si-MOSFETs 11a through 11f and applies the produced gate voltage signals Ga through Gf to their corresponding gate electrodes of the Si-MOSFETs 11a through 11f. Incidentally, reference numeral 70 indicates a field temperature detector, which is attached to the generator and generates a temperature signal corresponding to the temperature of a field winding.

Figure 2:
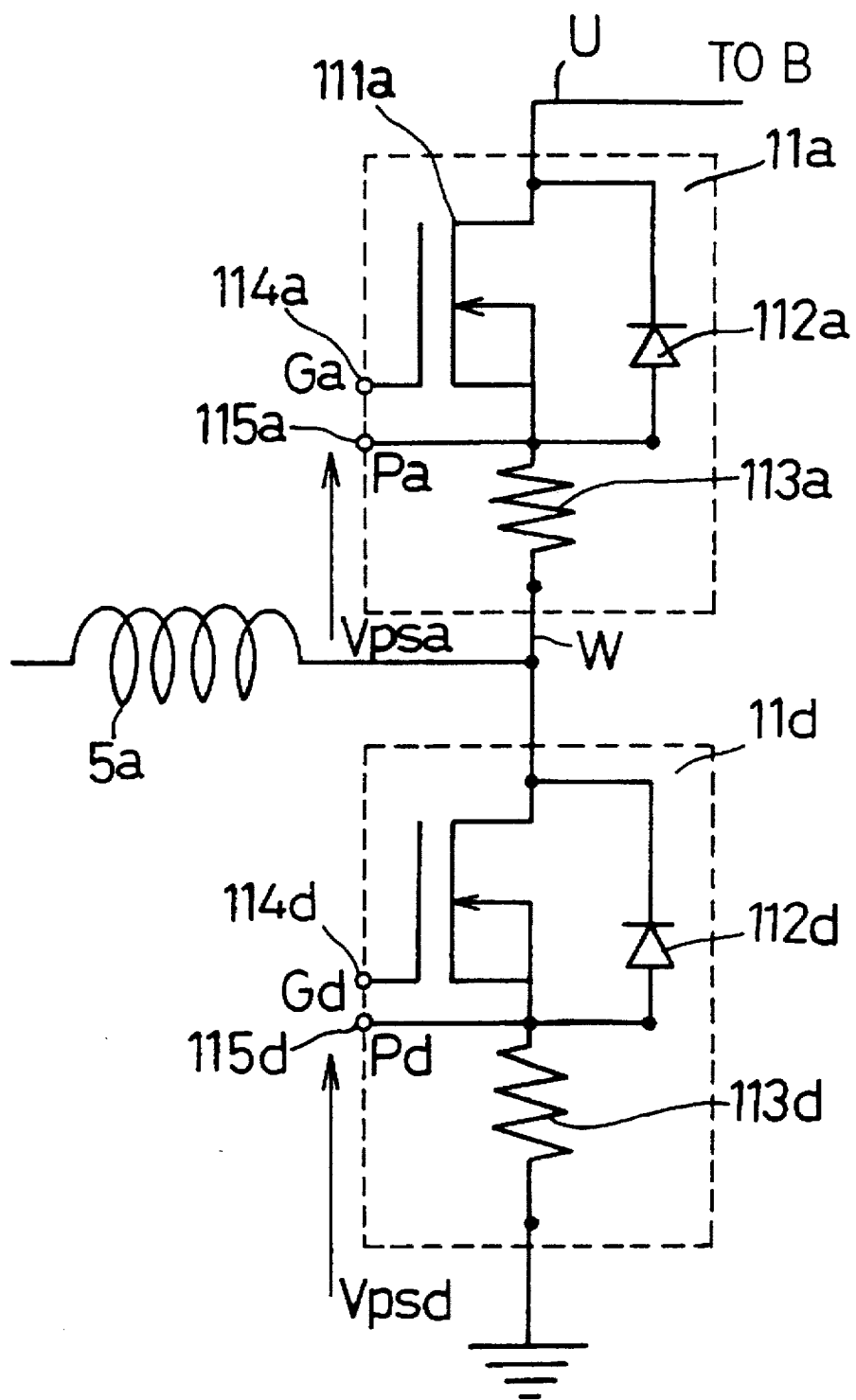
FIG. 2 is a single-phase circuit diagram of a three-phase full-wave rectifier 11 shown in FIG. 1.

An a-phase inverter of the three-phase full-wave rectifier 11 will now be described with reference to FIG. 2.

The Si-MOSFET 11a which serves as a high side switch and the Si-MOSFET 11d which serves as a low side switch are each N-channel type devices and are connected in series with one another. The Si-MOSFET 11a has an N-type region on the armature coil side, which serves as a drain region during power generation, an N-type region on the battery side, which serves as a source region during power generation, and a P-well region provided directly under the gate electrode 114a thereof. A PN junction between these N-type regions and the P-well region forms a parasitic diode.

In the Si-MOSFET 11a serving as the high side switch, the P-well region and the N-type region on the armature coil side are short-circuit connected to one another. Further, the N-type region on the armature coil side and an output terminal of the armature coil 5a are electrically connected to each other through a small resistance used for the detection of a current, such as a small resistance 113a formed on a chip with an insulating film interposed therebetween by patterning a semiconductor or a metallic trace or the like having a predetermined resistivity. Thus, the current can be detected by detecting a voltage drop developed across the low resistor 113a.

In the Si-MOSFET 11d, similarly to the above, a P-well region and an N-type region on the side opposite the armature coil side are short-circuit connected to each other. Further, the N-type region on the side opposite the armature coil side and a ground terminal are electrically connected to each other through a small resistance 113d for the detection of a current. Thus, the current can be detected by detecting a voltage drop developed across the resistor 113d. The remaining other Si-MOSFETs 11b, 11e, 11c and 11f respectively have resistors similar to the above resistors and include terminals Pb through Pf electrically connected to their corresponding points where N-type regions and the resistors are electrically connected to one another. Incidentally, the parasitic diodes 112a and 112d of the Si-MOSFETs 11a and 11d serve as current paths or channels used for supplying the generated current to the battery 9.

Thus, a current that flows when the Si-MOSFET 11a is turned on can be detected from the difference between a phase voltage Va and a potential applied to a connecting terminal Pa. Similarly, channel currents that flow in the Si-MOSFETs 11b through 11f can be detected.

Incidentally, the respective gate voltages are sufficiently high and each of the Si-MOSFETs 11a through 11f is used in a non-saturation active region (i.e., in an operating mode in which a channel is not pinched off in a depletion layer).

The opening/closing timing of each of the Si-MOSFETs 11a through 11f of the three-phase full-wave rectifier 11 will next be described.

Figures 3A, 3B, 3C, 3D:
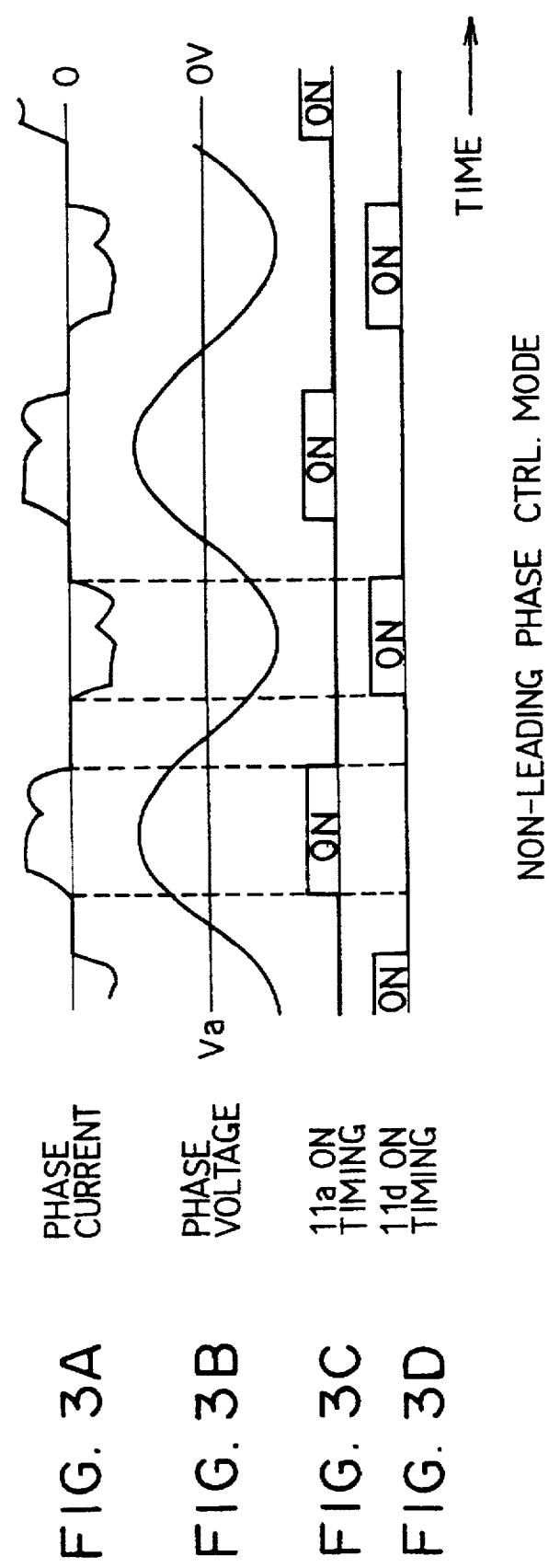
FIGS. 3A–3D are timing charts for describing the waveforms of a phase current and a phase voltage and opening/closing timings of MOSFETs 11a and 11d at the time of control of a non-leading phase current by the vehicle power generating system shown in FIG. 1.

(Where no leading phase current is supplied):

One example of the control for performing the non-supply of the leading phase current will first be described. FIG. 3B is a timing chart of the phase voltage Va developed in the armature coil 5a.

The control of the Si-MOSFET 11d, which serves as the a-phase low side switch, is performed as follows. It is checked whether the phase voltage Va of the armature coil 5a is lower than the ground voltage VE=0V and other phase voltages Vb and Vc. If the phase voltage Va is found to be lower than these voltages, then the Si-MOSFET 11d is turned on. The turning-off of the Si-MOSFET 11d is carried out at the time when the phase voltage Va has become higher than the ground voltage. The control of opening and closing of each of the Si-MOSFETs 11e and 11f which serve as the low side switches of other phases is performed in the same manner as described above.

Figure 5:
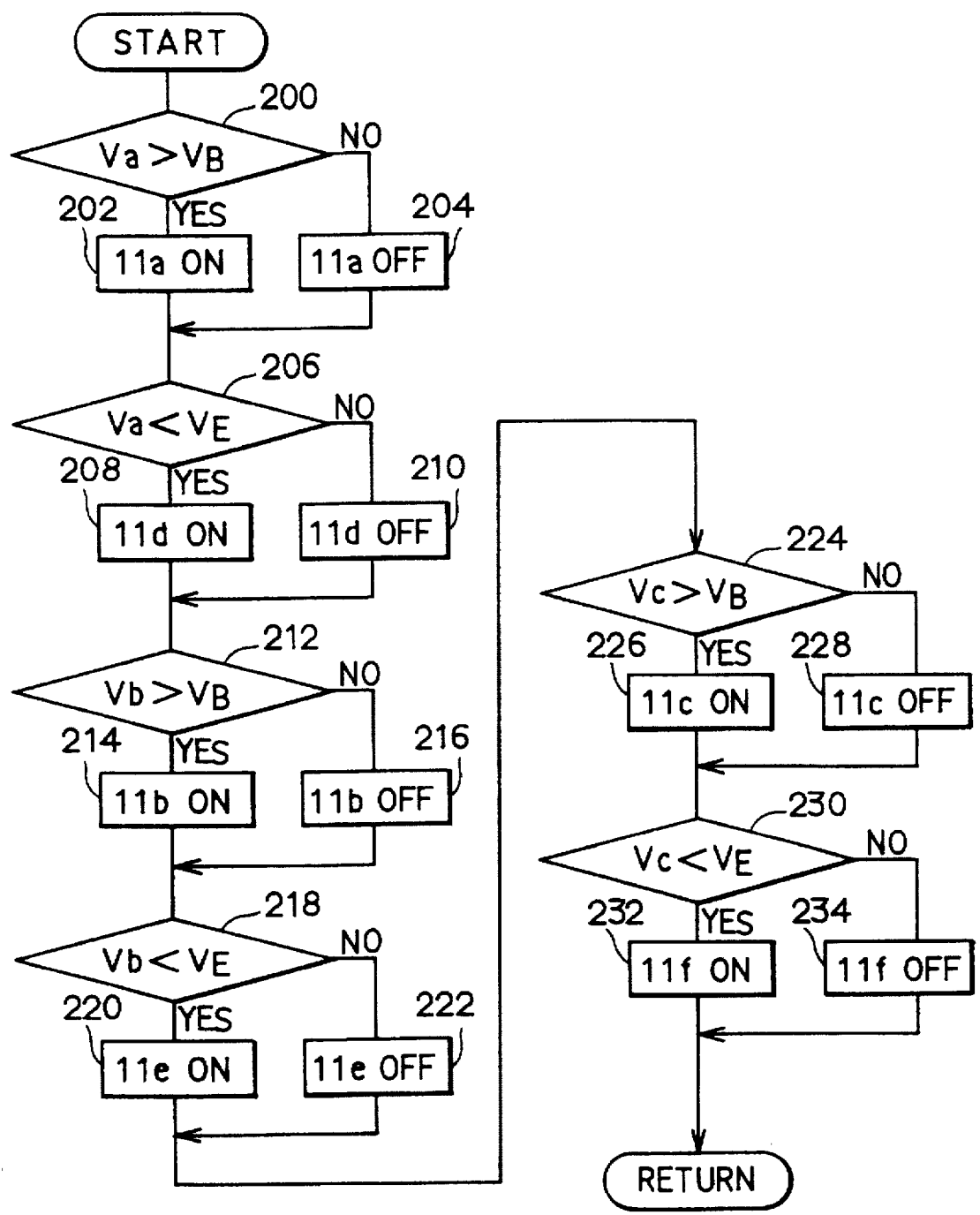
FIG. 5 is a flowchart for describing the control operation of a controller 7 shown in FIG. 1 at the time of control of the non-leading phase current.

One example of a subroutine for executing a non-leading phase mode will be described in accordance with a flowchart shown in FIG. 5. The subroutine shown in the flowchart will be executed while interrupting an unillustrated main routine at regular time intervals.

It is first checked whether a phase voltage Va of an x-phase exceeds the battery voltage VB (Step 200). If the answer is YES, then the high side switch 11a is turned on (Step 202). If the answer is NO, then the high side switch 11a is turned off (Step 204). A check is next made as to whether the phase voltage Va is smaller than 0V corresponding to a potential at the low-potential terminal of the battery (Step 206). If the answer is YES, then the low side switch 11d is turned on (Step 208). If the answer is NO, then the low side switch 11d is turned off (Step 210).

It is next checked whether a phase voltage Vb of a y-phase exceeds the battery voltage VB (Step 212). If the answer is found to be YES, then the high side switch 11b is turned on (Step 214). If the answer is found to be NO, then the high side switch 11b is turned off (Step 216). A check is next made as to whether the phase voltage Vb is lower than 0V corresponding to the potential at the low-potential terminal of the battery (Step 218). If the answer is found to be YES, then the low side switch 11e is turned on (Step 220). If the answer is found to be NO, then the low side switch 11e is turned off (Step 222).

It is next checked whether a phase voltage Vc of a z-phase exceeds the battery voltage VB (Step 224). If the answer is found to be YES, then the high side switch 11c is turned on (Step 226). If the answer is found to be NO, then the high side switch 11c is turned off (Step 228). A check is next made as to whether the phase voltage Vc is lower than 0V corresponding to the potential at the low-potential terminal of the battery (Step 230). If the answer is found to be YES, then the low side switch 11f is turned on (Step 232). If the answer is found to be NO, then the low side switch 11f is turned off (Step 234). Thereafter, execution returns to the main routine.

(Where the leading phase current is supplied):

One example of control for performing the supply of the leading phase current will now be described. FIG. 4B is a timing chart of the phase voltage Va developed in the armature coil 5a.

In the present embodiment, the turning-on timing of the Si-MOSFET 11a, which serves as the high side switch, is provided at the time when a phase current flowing therein changes from negative to positive, i.e., a time $t_2'(=t_0)$ delayed by $T_4$ ($=T_2$) from a time $t_2$ when a voltage drop Vpsd developed across the low resistor 113d changes from negative to positive. The turning-on timing of each of the other Si-MOSFETs 11b and 11c, which serve as the high side switches, is provided in the same manner as described above. Further, the turning-on timing of the Si-MOSFET 11d, which serves as the low side switch, is provided at the time when a phase current flowing therein changes from positive to negative, i.e., a time $t_1'$ delayed by $T_2$ from a time $t_1$ when a voltage drop Vpsa developed across the low resistor 113a changes from positive to negative. The turning-on timing of each of other Si-MOSFETs 11e and 11f, which serve as the low side switches, is provided in the same manner as described above.

On the other hand, the turning-on timing of each of the Si-MOSFETs 11a through 11f is extended up to the timing after a phase period of about 180° from the turning-on timing in the present embodiment. Namely, the Si-MOSFET 11a is turned off simultaneously with or immediately before the turning on of the Si-MOSFET 11d, whereas the Si-MOSFET 11d is turned off simultaneously with or immediately before the turning on of the Si-MOSFET 11a.

Figure 6:
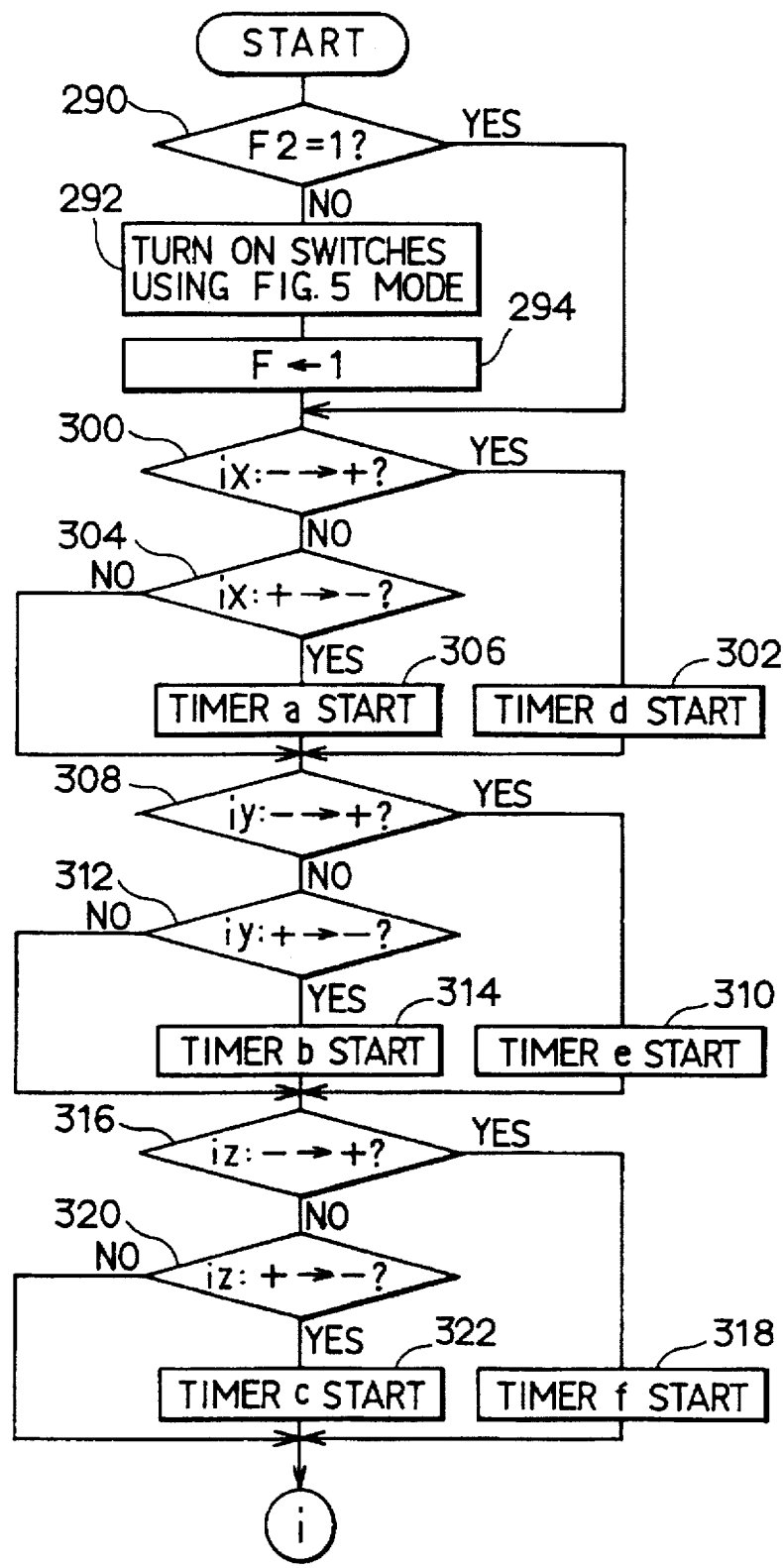
FIGS. 6 and 7 are a flowchart for describing another control operation of the controller 7 shown in FIG. 1 at the time of the control of the leading phase current.
Figure 7:
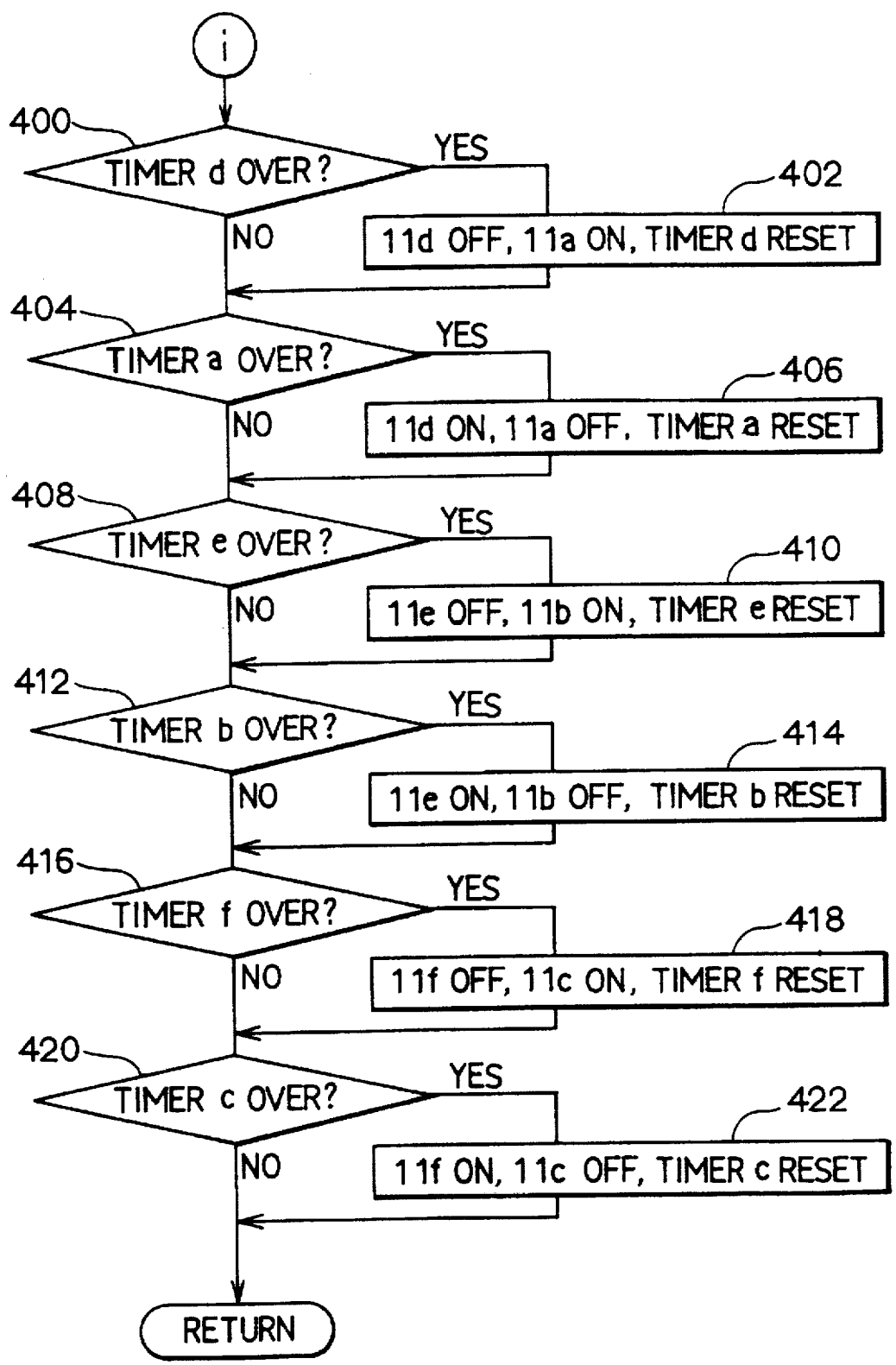

One example of a subroutine for executing a leading phase control mode will be described in accordance with flowcharts shown in FIGS. 6 and 7.

It is first checked whether a flag F2 for making a decision as to whether the execution of the subroutine is regarded as the first execution or not is 1 (Step 290). If the execution of the subroutine is found to be other than the first execution (F2=1), then execution jumps to Step 300. If the execution of the subroutine is found to be the first execution (F2=0), then only the operation for bringing the MOSFETs 11a through 11f into conduction (i.e., turning them on) is performed using the non-leading phase control routine shown in FIG. 5 (Step 292). Further, the flag F2 is set to 1 and execution proceeds to Step 300 (Step 294). Incidentally, the flag F2 will be reset to 0 upon power-up.

It is first checked at Step 300 whether the current or armature current ix flowing in the low side switch 11d changes from negative to positive, i.e., from the direction in which the current flows into the stator winding 5a to the direction in which the current flows out into the low-potential DC power terminal (0V) during a turning-on period of the low side switch 11d. If the answer is found to be YES, then an internal timer d is started (Step 302). If the answer is found to be NO, it is then checked whether the current or armature current ix flowing in the high side switch 11a changes from positive to negative, i.e., from the direction in which the current flows out from the stator winding 5a to the high-potential DC power terminal to the direction in which the current flows into the stator winding 5a during a turning-on period of the high side switch 11a (Step 304). If the answer is found to be YES, then an internal timer a is started (Step 306). If the answer is found to be NO, then execution proceeds to Step 308.

It is first checked at Step 308 whether the current or armature current iy flowing in the low side switch 11e changes from negative to positive i.e., from the direction in which the current flows into the stator winding 5b to the direction in which the current flows out into the low-potential DC power terminal (0V) during a turning-on period of the low side switch 11e. If the answer is found to be YES, then an internal timer e is started (Step 310). If the answer is found to be NO, it is then checked whether the current or armature current iy flowing in the high side switch 11b changes from positive to negative, i.e., from the direction in which the current flows out from the stator winding 5b to the high-potential DC power terminal to the direction in which the current flows into the stator winding 5b during a turning-on period of the high side switch 11e (Step 312). If the answer is found to be YES, then an internal timer b is started (Step 314). If the answer is found to be NO, then execution proceeds to Step 316.

It is first checked in Step 316 whether the current or armature current iz flowing in the low side switch 11f changes from negative to positive i.e., from the direction in which the current flows into the stator winding 5c to the direction in which the current flows out into the low-potential DC power terminal (0V) during a turning-on period of the low side switch 11f. If the answer is found to be YES, then an internal timer f is started (Step 318). If the answer is found to be NO, it is then checked whether the current or armature current iz flowing in the high side switch 11c changes from positive to negative, i.e., from the direction in which the current flows out from the stator winding 5c to the high-potential DC power terminal to the direction in which the current flows into the stator winding 5c during a turning-on period of the high side switch 11c (Step 320). If the answer is found to be YES, then an internal timer c is started (Step 322). If the answer is found to be NO, then execution proceeds to Step 400.

At Step 400, a check is made as to whether the time measured by timer d is over, i.e., only a predetermined delay time $\Delta T=T_2=T_4$ has elapsed. If it is determined at Step 400 that the time period measured by timer d is not over, then execution proceeds directly to Step 404. If it is determined at Step 400 that the timer d is over, then the low side switch 11d is turned off and the high side switch 11a is turned on. Further, the timer d is reset to 0 and thereafter execution proceeds to Step 404.

It is checked at Step 404 whether the time period measured by timer a is over, i.e., only the predetermined delay time (leading-phase current carrying or energizing time) $\Delta T=T_2=T_4$ has elapsed. If the answer is found to be NO at Step 404, then execution proceeds directly to Step 408. If the answer is found to be YES at Step 404, then the low side switch 11d is turned on and the high side switch 11a is turned off. Further, the timer a is reset to 0 and thereafter execution proceeds to Step 408.

It is checked at Step 408 whether the time period measured by timer e is over, i.e., only the predetermined delay time $\Delta T=T_2=T_4$ has elapsed. If the answer is found to be NO at Step 408, then execution proceeds directly to Step 412. If the answer is found to be YES at Step 408, then the low side switch 11e is turned off and the high side switch 11b is turned on. Further, the timer e is reset to 0 and thereafter execution proceeds to Step 412.

It is checked at Step 412 whether the time period measured by timer b is over, i.e., only the predetermined delay time $\Delta T=T_2=T_4$ has elapsed. If the answer is found to be NO at Step 412, then execution proceeds directly to Step 416. If the answer is found to be YES at Step 412, then the low side switch 11e is turned on and the high side switch 11b is turned off. Further, the timer b is reset to 0 and thereafter execution proceeds to Step 416.

It is checked at Step 416 whether the time period measured by timer f is over, i.e., only the predetermined delay time $\Delta T=T_2=T_4$ has elapsed. If the answer is found to be NO at Step 416, then execution proceeds directly to Step 420. If the answer is found to be YES at Step 416, then the low side switch 11f is turned off and the high side switch 11c is turned on. Further, the timer f is reset to 0 and thereafter execution proceeds to Step 420.

It is checked at Step 420 whether the time period measured by timer c is over, i.e., only the predetermined delay time $\Delta T=T_2=T_4$ has elapsed. If the answer is found to be NO at Step 420, then execution proceeds directly to Step 102. If the answer is found to be YES at Step 420, then the low side switch 11f is turned on and the high side switch 11c is turned off. Further, the timer c is reset to 0 and thereafter execution proceeds to Step 102.

In doing so, the paths or channels through which leading phase components are supplied to their armature coils 5a, 5b and 5c can be formed due to delays at the time of the turning off referred to above, thus resulting in the increase in the field. Even if the Si-MOSFET 11a has reached the time $t_1$, for example, the Si-MOSFET 11a is not turned OFF. Therefore, the turning off thereof is delayed by the time interval $\Delta T=T_2=T_4$. Similarly, the turning off of the Si-MOSFET 11d is also made at the time $t_2'$ delayed by $\Delta T=T_2=T_4$ from the time $t_2$. Thus, the current can be provided to each of the armature coils 5a through 5c. As a result, the current whose phase leads the phase voltage by a (see FIGS. 4A–4F) for producing a field increasing action is supplied to the stator coil 5a. It is now necessary to set the sum of a charging interval or period $T_1$ (=$T_3$) and the delay time $\Delta T=T_2=T_4$ to an electrical angle of 180° or less. Even if the phases are controlled in a state in which the b phase is allowed to lag the a phase by an electrical angle of 120° and the c phase is allowed to lead the a phase by an electrical angle of 120°, the leading phase control over the three phases can be performed.

In the aforementioned control example, each of the switches 11a through 11f is turned on only during an interval of 180°. However, the turning-on period may be less than 180°. Since the period in which both the high side switch and the low side switch are turned off is produced in each phase inverter circuit in this case, the following control may be performed.

A description will be made of the a phase, for example. If the phase voltage Va of the stator winding 5a relative to the a phase becomes higher than the battery voltage VB during the period in which the high side switch 11a and the low side switch 11d are being turned off, then the high side switch 11a is turned on. On the other hand, the turning off of the turned-on high side switch 11a may be performed after the predetermined delay time $\Delta T$ has elapsed since the phase voltage Va has become lower than the battery voltage VB in the same manner as described above.

Similarly, if the phase voltage Va becomes lower than the ground potential during the period in which the high side switch 11a and the low side switch 11d are being turned off, then the low side switch 11d is turned on. On the other hand, the turning off of the turned-on low side switch 11d may be carried out after the predetermined delay time $\Delta T$ has elapsed since the phase voltage Va has become lower than the ground voltage 0V in the same manner as described above. The control on the b and c phases is also performed in the same manner as described above. Incidentally, the aforementioned device opening/closing control is made to the a phase alone. The control of the b and c phases over the switches 11b, 11c, 11e and 11f may be performed with the a-phase switching timing shifted by 120°.

Figure 8:
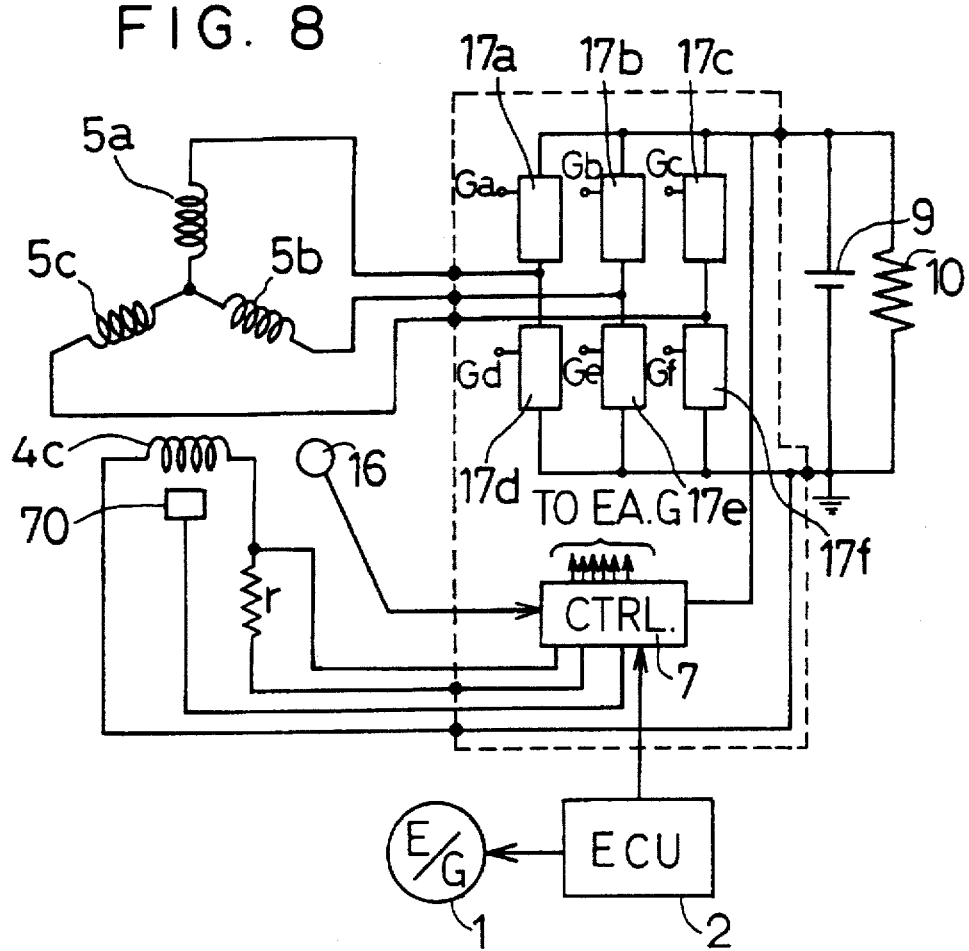
FIG. 8 is a circuit diagram for explaining a second embodiment of the vehicle power generating system shown in FIG. 1.

FIG. 8 is a block circuit diagram of a vehicle AC power generator illustrating a modification 1 of the embodiment shown in FIG. 1. The present block circuit diagram showing the vehicle AC power generator is the same as the block circuit diagram of FIG. 1 except that the present vehicle AC power generator includes a magnetic pole position detector (corresponding to a phase angle detecting means in the appended claims) 16 for detecting the position of each magnetic pole of a rotor and a small resistive element r used for the detection of a field current. Incidentally, the resistive element r is electrically series-connected to a field coil 4c. A controller 7 detects the field current from a voltage drop developed across the resistive element r and reads engine information from an ECU 2 for controlling an engine 1. In the present embodiment, MOSFETs 17a through 17f of a three-phase full-wave rectifier 11 are different from the MOSFETs 11a through 11f in that they do not have such resistors for current detection.

The control for opening and closing the MOSFETs 17a through 17f constructed in the above-described manner will next be described below with reference to timing charts shown in FIGS. 9A–9O.

In the present embodiment, the position of each magnetic pole of the rotor is detected by the magnetic pole position detector 16. The magnetic pole position detector 16 is composed of an absolute position-type rotary encoder. Further, the magnetic pole position detector 16 outputs a reference pulse signal at a reference angular position and outputs a pulse signal at each predetermined incremental angle. The controller 7 counts a pulse signal from the read reference pulse signal and outputs phase angle signals Sa, Sb and Sc to control the MOSFETs 17a through 17f. The controller 7 outputs a high level at a phase angle δ1 at which a phase voltage Va corresponding to an output voltage from an armature coil (armature winding) 5a of an X phase changes from negative to positive and outputs a low level at a phase angle δ2 at which the phase voltage Va changes from positive to negative. Further, the controller 7 outputs a high level at a phase angle δ3 at which a phase voltage Vb corresponding to an output voltage from an armature coil (armature winding) 5b of a Y phase changes from negative to positive and outputs a low level at a phase angle δ4 at which the phase voltage Vb changes from positive to negative. Furthermore, the controller 7 outputs a high level at a phase angle δ5 at which a phase voltage Vc corresponding to an output voltage from an armature coil (armature winding) 5c of a Z phase and outputs a low level at a phase angle δ6 at which the phase voltage Vc changes from positive to negative.

Since a non-leading phase control mode itself can be set equal to that shown in FIG. 5, a leading phase control mode will be described below. The leading phase control made under the present embodiment is as follows. As shown in FIGS. 9A–9O, the MOSFET 17a and the MOSFET 17d are respectively turned on and off at the time when the phase angle for the leading phase control lags behind the phase angle δ1 by a phase angle equivalent to a predetermined delay or lag angle δ. The MOSFET 17a and the MOSFET 17d are respectively turned off and on at the time when the phase angle for the leading phase control lags behind the phase angle δ2 by the phase angle equivalent to the predetermined lag angle δ. The MOSFET 17b and the MOSFET 17e are respectively turned on and off at the time when the phase angle for the leading phase control lags behind the phase angle δ3 by the phase angle equivalent to the predetermined lag angle δ. The MOSFET 17b and the MOSFET 17e are respectively turned off and on at the time when the phase angle for the leading phase control lags behind the phase angle δ4 by the phase angle equivalent to the predetermined lag angle δ. The MOSFET 17c and the MOSFET 17f are respectively turned on and off at the time when the phase angle for the leading phase control lags behind the phase angle δ5 by the phase angle equivalent to the predetermined lag angle δ. Further, the MOSFET 17c and the MOSFET 17f are respectively turned off and on at the time when the phase angle for the leading phase control lags behind the phase angle δ6 by the phase angle equivalent to the predetermined lag angle δ.

The same leading phase control as that shown in FIG. 1 can be achieved if the above construction is made. A method of setting a leading-phase current carrying or energizing time comprised of the delay time ΔT employed in the vehicle power generating system shown in FIG. 1 and the lag angle δ employed in the vehicle AC power generator shown in FIG. 8 will be described in greater detail below.

Figure 10:
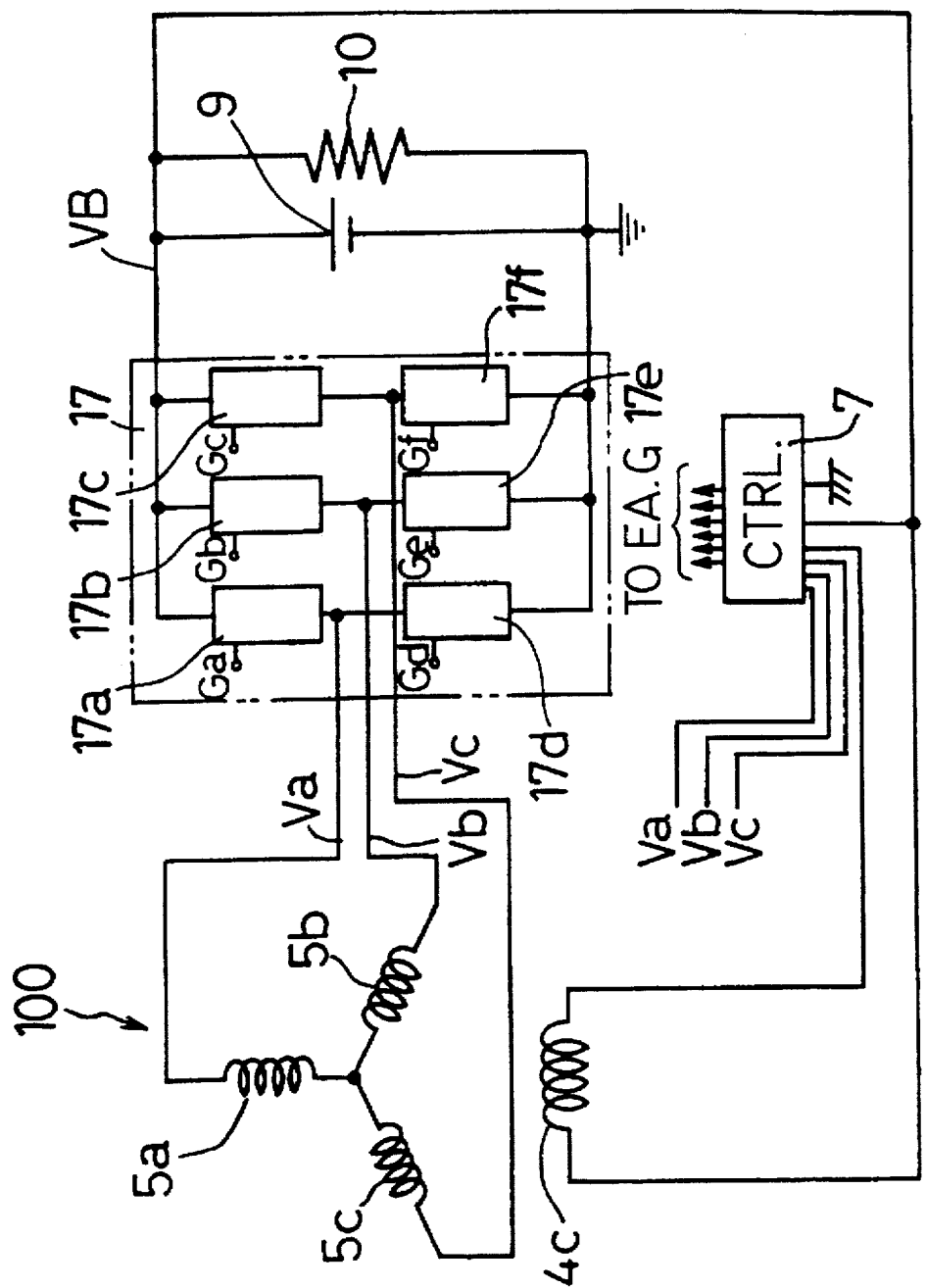
FIG. 10 is a circuit diagram for explaining a third embodiment of the vehicle power generating system shown in FIG. 1.

A power generating system illustrating a second embodiment of the present invention will now be described with reference to FIG. 10. The power generating system shown in FIG. 10 is one of a type wherein the MOSFETs 11a through 11f of the three-phase full-wave rectifier 11 shown in FIG. 1 are respectively replaced by MOSFETs 17a through 17f excluding small resistive elements for current detection in a manner similar to FIG. 2.

Since the non-leading phase control itself can adopt the control mode shown in FIG. 5, a leading-phase current control mode of the second embodiment will be described below with reference to the flowcharts shown in FIGS. 6 and 7. The present modification is different from the embodiment shown in FIG. 1 in that the opening/closing timing of each of the MOSFETs 17a through 17f is decided based on the difference in potential between the source and drain of each of the MOSFETs 17a through 17f. FIG. 6 shows a routine for making a decision about a zero-crossing point of each armature current, and FIG. 7 shows a routine for controlling the opening/closing of each of the MOSFETs 17a through 17f. The present embodiment is different from the first embodiment in which the zero-crossing point is detected based on the voltage drop developed across each resistor, only in that the zero-crossing point of each armature current is determined based on the difference in potential between the source and drain of each of the MOSFETs 17a through 17f.

It is first checked whether a flag F2 for making a decision as to whether the execution of the routine is the first execution or not is 1 (Step 290). If the execution of the routine is found to be other than the first execution (F2=1), then execution jumps to Step 300. If the execution of the routine is found to be the first execution (F2=0), then only the operation for bringing the MOSFETs 17a through 17f into conduction (i.e., turning them on) is performed using the routine shown in FIG. 8 (Step 292). Further, the flag F2 is set to 1 and execution proceeds to Step 300 (Step 294). Incidentally, the flag F2 will be reset to 0 upon power-up.

It is first checked at Step 300 whether the current or armature current ix flowing in the low side switch 17d changes from negative to positive, i.e., from the direction in which the current flows into the stator winding 5a to the direction in which the current flows out into the low-potential DC power terminal (0V), depending on whether Va has become greater than or equal to 0V during a turning-on period of the low side switch 17d. If the answer is found to be YES at Step 300, then the internal timer d is started (Step 302). If the answer is found to be NO at Step 300, it is then checked whether the current or armature current ix flowing in the high side switch 17a changes from positive to negative, i.e., from the direction in which the current flows out from the stator winding 5a to the high-potential DC power terminal to the direction in which the current flows into the stator winding 5a, depending on whether Va has become smaller than or equal to than VB during a turning-on period of the high side switch 17a (Step 304). If the answer is found to be YES at Step 304, then the internal timer a is started (Step 306). If the answer is found to be NO at Step 304, then execution proceeds to Step 308.

It is first checked at Step 308 whether the current or armature current iy flowing in the low side switch 17e changes from negative to positive, i.e., from the direction in which the current flows into the stator winding 5b to the direction in which the current flows out into the low-potential DC power terminal (0V), depending on whether Vb has become greater than or equal to 0V during a turning-on period of the low side switch 17e. If the answer is found to be YES at Step 308, then the internal timer e is started (Step 310). If the answer is found to be NO at Step 308, it is then checked whether the current or armature current iy flowing in the high side switch 17b changes from positive to negative, i.e., from the direction in which the current flows out from the stator winding 5b to the high-potential DC power terminal to the direction in which the current flows into the stator winding 5b, depending on whether Vb has become less than or equal to VB during a turning-on period of the high side switch 17b (Step 312). If the answer is found to be YES at Step 312, then the internal timer b is started (Step 314). If the answer is found to be NO at Step 312, then execution proceeds to Step 316.

It is first checked at Step 316 whether the current or armature current iz flowing in the low side switch 17f changes from negative to positive, i.e., from the direction in which the current flows into the stator winding 5c to the direction in which the current flows out into the low-potential DC power terminal (0V), depending on whether Vc has become greater than or equal to 0V during a turning-on period of the low side switch 17f. If the answer is found to be YES at Step 316, then the internal timer f is started (Step 318). If the answer is found to be NO at Step 316, it is then checked whether the current or armature current iz flowing in the high side switch 17c changes from positive to negative, i.e., from the direction in which the current flows out from the stator winding 5c to the high-potential DC power terminal to the direction in which the current flows into the stator winding 5c, depending on whether Vc has become less than or equal to VB during a turning-on period of the high side switch 17c (Step 320). If the answer is found to be YES at Step 316, then the internal timer c is started (Step 322). If the answer is found to be NO at Step 316, then execution proceeds to Step 400.

At Step 400, a check is made as to whether the time period measured by timer d is over, i.e., only a predetermined delay time $\Delta T=T_2=T_4$ has elapsed. If it is determined at Step 400 that the time period measured by timer d is not over, then execution proceeds directly to Step 404. If it is determined at Step 400 that the time period measured by timer d is over, then the low side switch 17d is turned off and the high side switch 17a is turned on. Further, the timer d is reset to 0 and thereafter execution proceeds to Step 404.

It is checked at Step 404 whether the time period measured by timer a is over, i.e., only the predetermined delay time $\Delta T=T_2=T_4$ has elapsed. If the answer is found to be NO at Step 404, then execution proceeds directly to Step 408. If the answer is found to be YES at Step 404, then the low side switch 17d is turned on and the high side switch 17a is turned off. Further, the timer a is reset to 0 and thereafter execution proceeds to Step 408.

It is checked at Step 408 whether the time period measured by timer e is over, i.e., only the predetermined delay time $\Delta T=T_2=T_4$ has elapsed. If the answer is found to be NO at Step 408, then execution proceeds directly to Step 412. If the answer is found to be YES at Step 408, then the low side switch 17e is turned off and the high side switch 17b is turned on. Further, the timer e is reset to 0 and thereafter execution proceeds to Step 412.

It is checked at Step 412 whether the time period measured by timer b is over, i.e., only the predetermined delay time $\Delta T=T_2=T_4$ has elapsed. If the answer is found to be NO at Step 412, then execution proceeds directly to Step 416. If the answer is found to be YES at Step 412, then the low side switch 17e is turned on and the high side switch 17b is turned off. Further, the timer b is reset to 0 and thereafter execution proceeds to Step 416.

It is checked at Step 416 whether the time period measured by timer f is over, i.e., only the predetermined delay time $\Delta T=T_2=T_4$ has elapsed. If the answer is found to be NO at Step 416, then execution proceeds directly to Step 420. If the answer is found to be YES at Step 416, then the low side switch 17f is turned off and the high side switch 17c is turned on. Further, the timer f is reset to 0 and thereafter execution proceeds to Step 420.

It is checked at Step 420 whether the time period measured by timer c is over, i.e., only the predetermined delay time $\Delta T=T_2=T_4$ has elapsed. If the answer is found to be NO at Step 420, then execution proceeds directly to Step 102. If the answer is found to be YES at Step 420, then the low side switch 17f is turned on and the high side switch 17c is turned off. Further, the timer c is reset to 0 and thereafter execution returns to the main routine.

Figure 11:
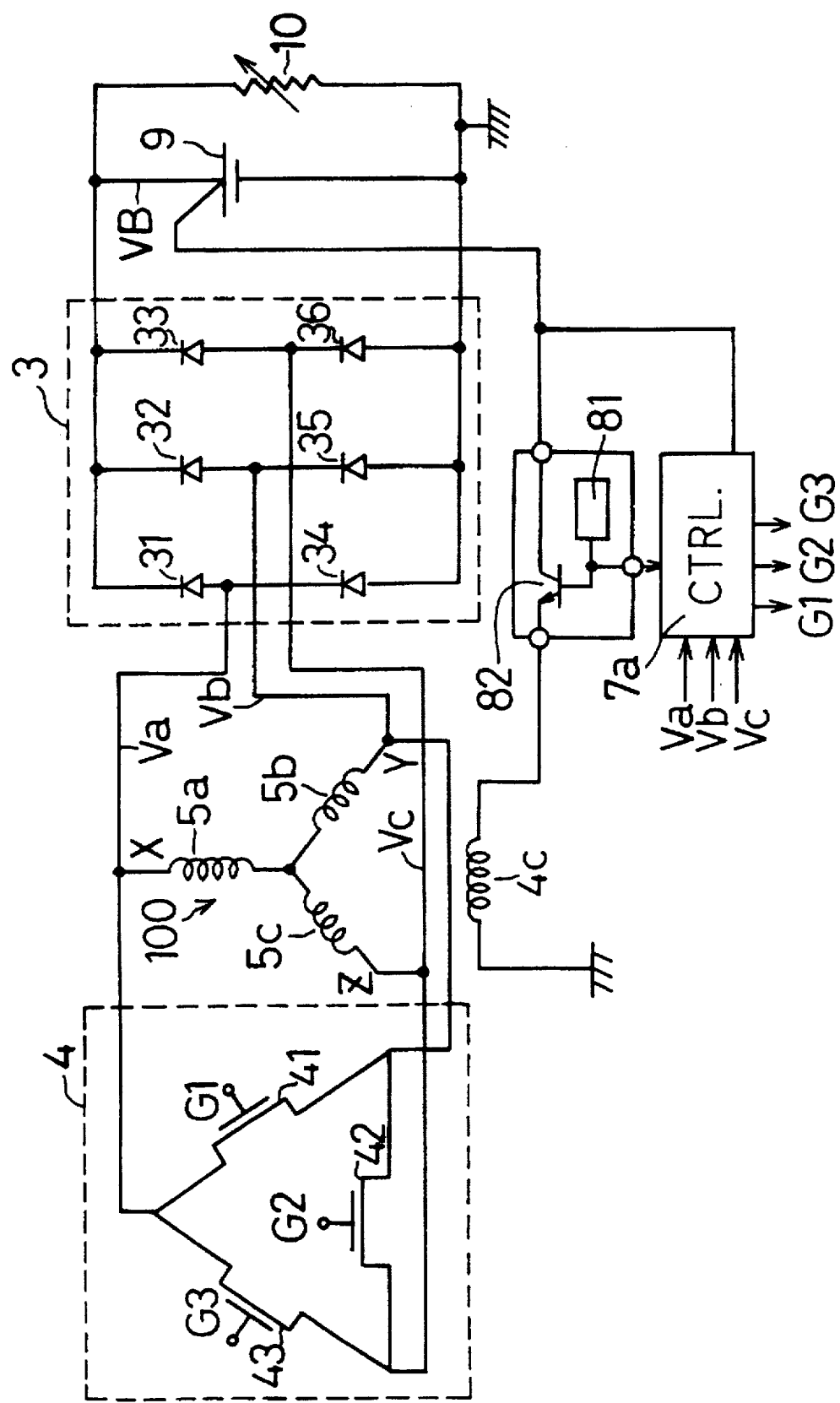
FIG. 11 is a circuit diagram for explaining a fourth embodiment of the vehicle power generating system shown in FIG. 1.

A third embodiment of the present invention will now be described with reference to FIG. 11.

The vehicle power generating system according to the third embodiment comprises a vehicle three-phase synchronous generator (corresponding to an alternator in the appended claims) 100 having Lundell-Rice type field poles, a three-phase full-wave rectifier (corresponding to an AC-DC power converting means in the appended claims) 3 for rectifying an AC current generated from the vehicle three-phase synchronous generator 100, a short-circuiting circuit 4, a controller 7a for controlling the short-circuiting circuit 4 and a regulator 8 for the control of a field current. The short-circuiting circuit 4 and the controller 7a constitute a leading-phase current control means in the appended claims.

The three-phase synchronous generator 100 includes three-phase armature windings 5a, 5b and 5c each wound on a stator core and a field winding 4c wound on a rotor core. The three-phase synchronous generator 100 is a so-called alternator driven by an engine. As is well known, three-phase AC voltages Va, Vb and Vc are respectively induced in the armature windings 5a, 5b and 5c by supplying a necessary field current from the regulator 8 to the field winding 4c and rotating the rotor core by the engine.

The controller 7a has a microprocessor incorporated therein. The controller 7a serves as a circuit for controlling respective short-circuit switches 41 through 43 of the short-circuiting circuit 4 based on output voltages (phase voltages) from the armature windings 5a, 5b and 5c and supplying a predetermined amount of leading phase current to each of the armature windings 5a, 5b and 5c at a predetermined timing.

The regulator 8 has a conductivity or conduction-rate determining circuit 81 for comparing the battery voltage VB with a predetermined reference voltage to keep the battery voltage VB constant, determining the conductivity of a field current If from the result of comparison and controlling a switching transistor 82 based on the determined conductivity. The switching transistor 82 intermittently controls the field current supplied to the field winding 4c.

The three-phase full-wave rectifier 3 is a conventional one. Further, the three-phase full-wave rectifier 3 rectifies the output generated from the vehicle three-phase synchronous generator 100 and supplies the rectified output to the battery 9 and an electrical load 10.

The short-circuiting circuit 4 comprises the short-circuit switches 41 through 43 each composed of a power MOSFET made up of SiC, which are provided in the form of a delta connection (or star connection). Points where the short-circuit switches 41 through 43 are respectively connected to one another are electrically connected to their corresponding output terminals of the armature windings 5a, 5b and 5c.

Since the phase voltages Va through Vc may be rectified by the three-phase full-wave rectifier 3 without bringing the short-circuit switches 41 through 43 into conduction, non-leading phase control of the third embodiment will not be described in detail. In the present embodiment, the phase voltage Va will lead the phase voltage Vb by 120° and the phase voltage Vb will lead the phase voltage Vc by 120°. For simplicity of illustration, forward voltage drops developed across diodes 31 through 36 of the three-phase full-wave rectifier 3 will be neglected.

Figure 12:
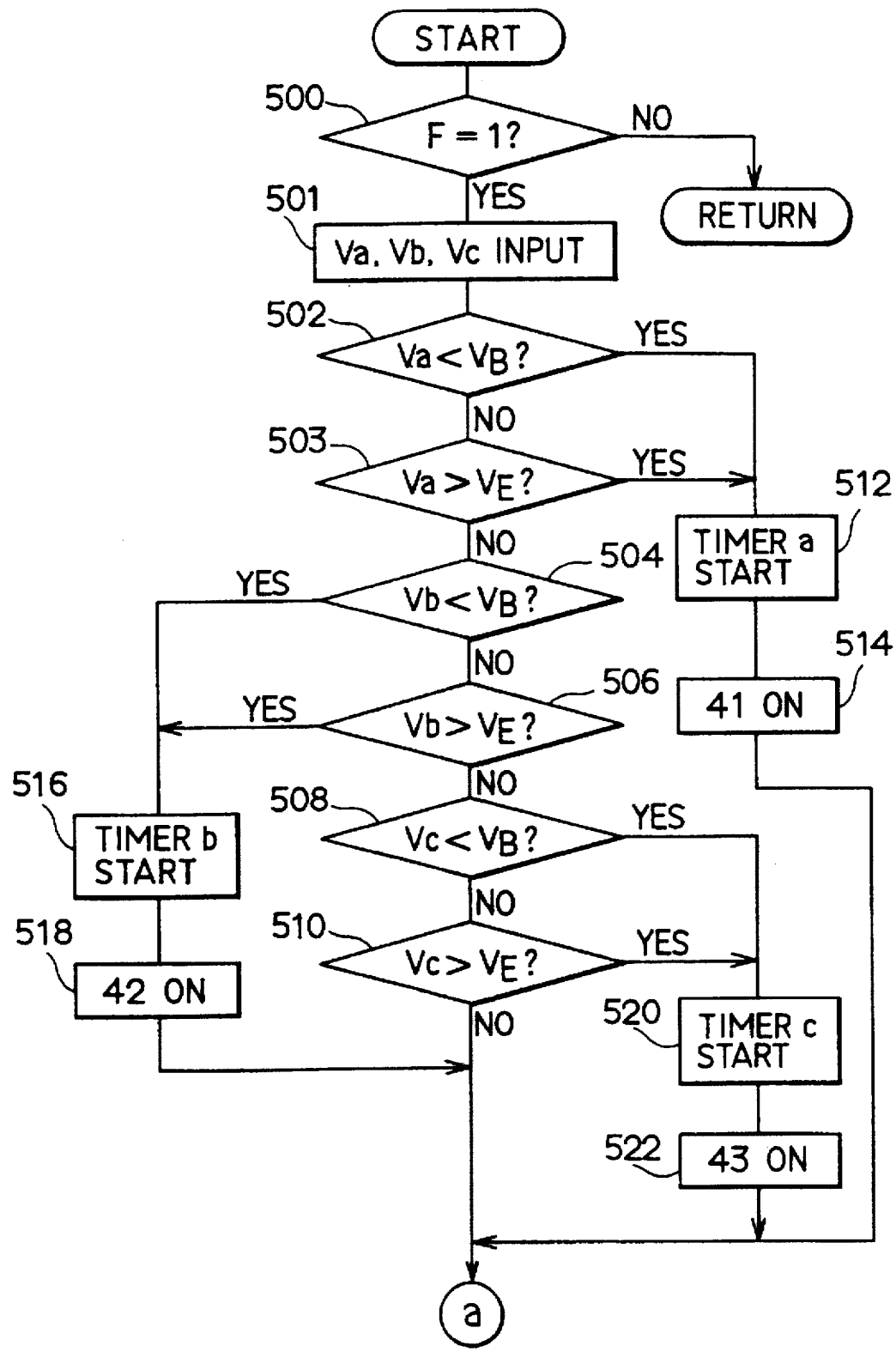
FIGS. 12 and 13 are a flowchart for describing the control operation of a controller shown in FIG. 12 at the time of control of a non-leading phase current.
Figure 13:
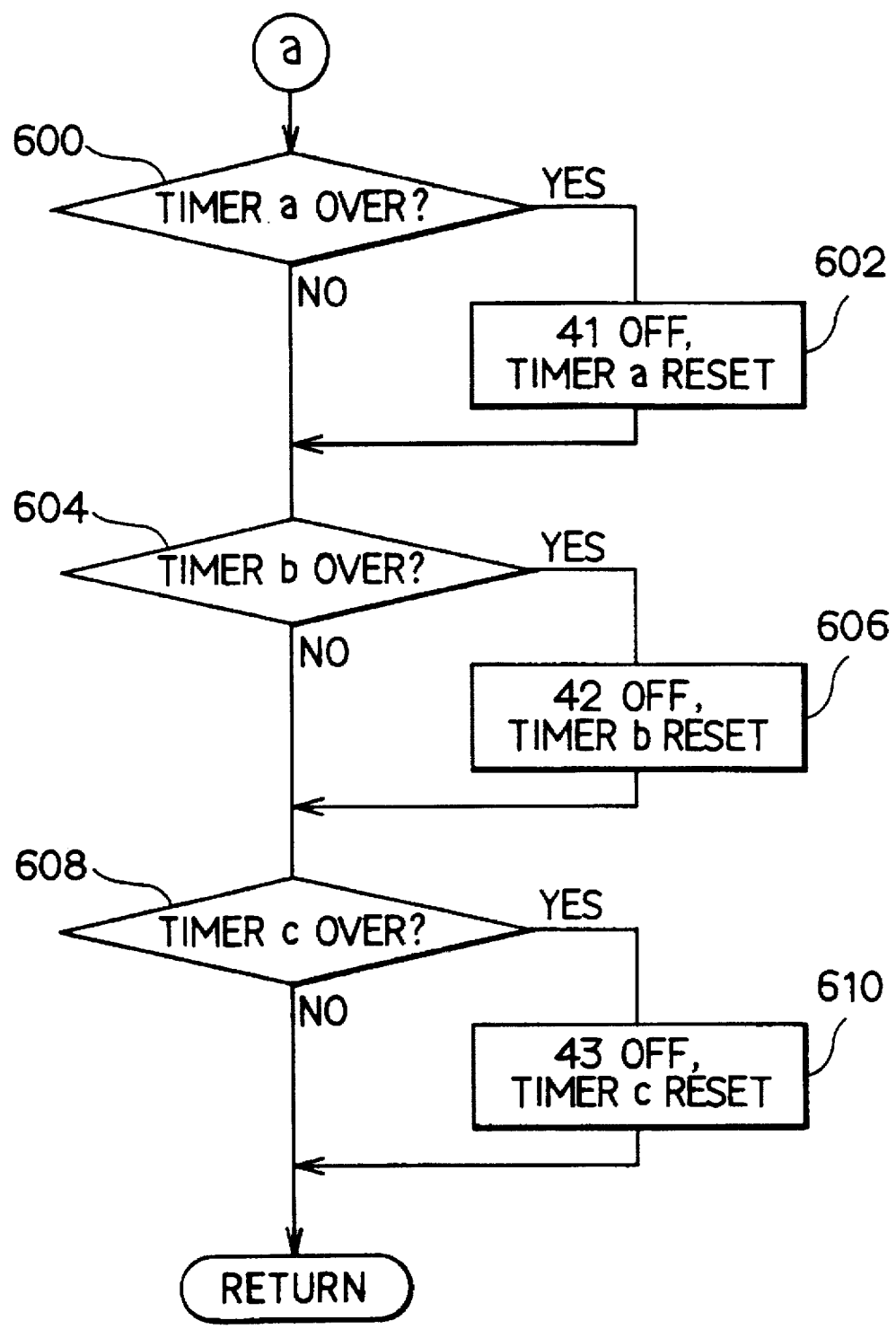

The leading-phase current control of the third embodiment will be described below with reference to flowcharts shown in FIGS. 12 and 13. A subroutine shown in FIGS. 12 and 13 is an interrupt routine preferably executed periodically at a predetermined time interval.

It is first checked whether a flag F for instructing the execution of the short-circuit control is 1 (Step 500). If the flag F is found to be 0 at Step 500, execution returns to a main routine (not shown) as the presence of the instruction for the execution of the short-circuit control. If the flag F is found to be 1 at Step 500, then execution proceeds to Step 501.

At Step 501, the phase voltages Va through Vc are read. A check is next made as to whether the read phase voltage Va is less than the battery voltage VB (Step 502). If the answer is found to be NO at Step 502, then execution proceeds to Step 503. If the answer is found to be YES at Step 502, then execution proceeds to Step 512. It is checked at Step 503 whether the phase voltage Va is greater than a ground voltage VE (=0V). If the answer is found to be NO at Step 503, then execution proceeds to Step 504. If the answer is found to be YES at Step 503, then execution proceeds to Step 512. At Step 512, a timer a for setting a conduction time of the short-circuit switch 41 is started to immediately turn on the short-circuit switch 41 (Step 514). Thereafter, execution proceeds to Step 600.

It is checked at Step 504 whether the phase voltage Vb is smaller than the battery voltage VB. If the answer is found to be NO at Step 504, then execution proceeds to Step 506. If the answer is found to be YES at Step 504, then execution proceeds to Step 516. It is next checked at Step 506 whether the phase voltage Vb is greater than the ground voltage VE (=0V). If the answer is found to be NO at Step 506, then execution proceeds to Step 508. If the answer is found to be YES at Step 506, then execution proceeds to Step 516. At Step 516, a timer b for setting a conduction time of the short-circuit switch 42 is started to immediately turn on the short-circuit switch 42 (Step 518). Thereafter, execution proceeds to Step 600.

It is checked at Step 508 whether the phase voltage Vc is smaller than the battery voltage VB. If the answer is found to be NO at Step 508, then execution proceeds to Step 510.

If the answer is found to be YES at Step 508, then execution proceeds to Step 520. It is next checked at Step 510 whether the phase voltage Vc is greater than the ground voltage VE (=0). If the answer is found to be NO at Step 510, then execution proceeds to Step 600. If the answer is found to be YES at Step 510, then execution proceeds to Step 520. At Step 520, a timer c for setting a conduction time of the short-circuit switch 43 is started to immediately turn on the short-circuit switch 43 (Step 522). Thereafter, execution proceeds to Step 600.

Incidentally, the reason why execution jumps over to Step 600 immediately after completion of Steps 514 and 518 is that the routine shown in FIGS. 12 and 13 is regularly and frequently executed and the short-circuit switches 41 through 43 are not turned on together due to the differences in phase between the short-circuit switches 41 through 43 within a one routine cyclic time. Further, a predetermined delay time ΔT calculated or preset by an embodiment to be described later will be set in each of the timers a, b and c.

It is checked at the following Step 600 whether a time measured by the timer a has reached the delay time ΔT set in the timer a. If the answer is found to be NO at Step 600, then execution proceeds to Step 604. If the answer is found to be YES at Step 600, then the short-circuit switch 41 is turned off and the timer a is reset (Step 602). Thereafter, execution proceeds to Step 604.

It is checked at the following Step 604 whether a time measured by the timer b has reached the delay time ΔT set in the timer b. If the answer is found to be NO at Step 604, then execution proceeds to Step 608. If the answer is found to be YES at Step 604, then the short-circuit switch 42 is turned off and the timer b is reset (Step 606). Thereafter, execution proceeds to Step 604.

It is next checked at Step 608 whether a time measured by the timer c has reached the delay time ΔT set in the timer c. If the answer is found to be NO at Step 608, then execution returns to the main routine (not shown). If the answer is found to be YES at Step 608, then the short-circuit switch 43 is turned off and the timer c is reset (Step 610). Thereafter, execution returns to the main routine.

If the discharged or outflow currents are brought to zero, then the leading phase currents (short-circuit currents) flow into their corresponding armature windings 5a, 5b and 5c through the short-circuit switches 41 through 43 due to the above operation, whereas if the inflow currents are brought to zero, then the leading phase currents (short-circuit currents) flow out through the short-circuit switches 41 through 43, whereby the supply of the leading phase currents can be achieved.

An electromagnetic phenomenon produced by the conduction control of the short-circuit switch 41 will now be described below with reference to FIGS. 4A–4F.

In the third embodiment, the passage of the short-circuit current through its corresponding armature winding is started at a time $t_1$ and completed at a time (hereinafter called "$t_1'$") when a short-circuit time is brought to an end. When no short-circuit current is supplied, the phase voltage Va is normally smaller than VB but has a value greater than a voltage (0V) at a low-potential DC power terminal. When the short-circuit current is not supplied, the phase current Va does not flow in the stator winding 5a from the low-potential DC power terminal after the elapse of the time $t_1'$. However, when the short-circuit phase current is caused to flow in the stator winding 5a of the stator windings during a period from the time $t_1$ to the time $t_1'$, a counterelectromotive force developed in the stator winding 5a upon the turning off of the short-circuit switch 41 at the time $t_1'$ is produced in the direction of reducing the potential or the phase voltage Va at an output terminal of the stator winding 5a. Therefore, the phase voltage Va is reduced by the produced counterelectromotive force and hence the phase voltage Va becomes lower than the potential (0V) at the low-potential DC power terminal. As a result, the current is able to flow from the low-potential DC power terminal to the stator winding 5a through the diode 34.

In other words, it is considered that electromagnetic energy is stored in the stator winding 5a owing to the passage of the short-circuit current through the stator winding 5a and the electromagnetic energy is released after the time $t_1'$. The current that flows subsequent to the time $t_1'$ is recovered by a battery 9 through a high-potential DC power terminal. For similar reasons, it is considered that when the short-circuit current flows out from the stator winding 5a during a period from a time $t_2$ to a time $t_2'$, electromagnetic energy is stored in the stator winding 5a owing to the passage of the short-circuit current therethrough and the electromagnetic energy is released after the time $t_2'$. The current that flows subsequent to the time $t_2'$ is recovered by the battery 9 through the high-potential DC power terminal.

The third embodiment can bring about an excellent advantageous effect in that since the phase current is supplied to each of the short-circuit switches 41 through 43 referred to above, the battery 9 is not discharged even in the event that these switches are brought into cut-off disable states, whereby safety is ensured.

A fourth embodiment of the present invention in which the above-described passage of the phase current through each stator winding is applied to the control of operation of the vehicle power generating system will be described below. However, a mode using the turning-angle sensor (i.e., an absolute position-type rotary encoder) 16 shown in FIG. 7 will be described as the leading-phase current control mode by way of example for simplicity of illustration. It is, however, needless to say that other modes referred to above may be adopted.

The fourth embodiment of the present invention, which performs the leading-phase current control based on the rate of generation of power by the power generator 100, will be described with reference to a flowchart shown in FIG. 14 as one example for describing the state of generation of power by the power generator 100.

The controller 7 first waits until the rate of generation of power by the power generator 100 is greater than or equal to a predetermined threshold value A (e.g., 100%) (Step 1000). Then, it is then determined that a heavy-load state or power insufficient state has occurred. Further, the rotational speed is detected from a turning-angle signal detected by the turning-angle sensor 16 shown in FIG. 8 (Step 1010). In the present embodiment, the rate of power generation will be defined as a conduction rate or conductivity of a control voltage applied to a base electrode of a switching transistor (not shown) which is incorporated in the controller 7 shown in FIG. 8 and controls the field current supplied to the field winding 4c. The conduction rate is assumed to be achieved by the controller 7 under the known control of the switching transistor so that the battery voltage VB coincides or matches with a predetermined target voltage.

At the next Step 1020, a lag angular value δa indicative of the maximum efficiency at the detected rotational speed n is read from a map stored in a memory (not shown) included in the controller 7 and in which the relationship between n and sa has been stored in advance. The read lag angular value δa is stored in a register (not shown) of a CPU (not shown) in the controller 7. As indicated by the timing charts of FIGS. 9A–9O, although not shown in a flowchart, the controller 7 executes a subroutine for opening and closing each of the MOSFETs 17a through 17f at a timing in which the phase angles for the leading phase control respectively lag the phase angles s1 through s6 by the lag angular value δa, at regular time intervals or at regular angles independent of the main routine shown in FIG. 14. Incidentally, the relationship between the lag angular value δa at which the power generator 100 can produce the maximum efficiency when the rate of power generation is greater than or equal to A and the rotational speed n is measured in advance and stored in the memory.

It is next checked whether a predetermined time has elapsed since the time when the passage of the leading phase current through the armature winding has started at the lag angular value δa for providing the maximum efficiency of the power generator 100 (Step 1025). If the answer is found to be NO at Step 1025, then execution returns to Step 1010. If the answer is found to be YES at Step 1025, it is then checked whether the rate of power generation is greater than or equal to A in order to check whether the capacity of the battery 9 is in a recovered state according to the passage of the leading phase current therethrough at the maximum efficiency, i.e., the power shortage has been resolved (Step 1030). If the rate of power generation is found to be less than A, it is then determined that the battery 9 is being charged due to the passage of the leading phase current therethrough at maximum efficiency and hence the power shortage is being resolved. Thereafter, execution proceeds to Step 1040. If the rate of power generation still remains greater than or equal to A, it is then determined that the passage of the leading phase current therethrough under the condition of the maximum efficiency does not resolve the power shortage. Thus, the rotational speed n is detected again (Step 1060). A lag angular value δb for providing the maximum output of the power generator 100 at the detected rotational speed n is read from the map stored in the memory (not shown) included in the controller 7 and in which the relationship between n and s has been stored in advance. The read lag angular value δb is stored in the register (not shown) of the CPU (not shown) in the controller 7. The controller 7 executes the subroutine for opening and closing each of the MOSFETs 17a through 17f at a timing at which the phase angles for the leading phase control respectively lag the phase angles s1 through s6 by the lag angular value δb, at regular time intervals or at regular angles independent of the main routine shown in FIG. 14. Incidentally, the relationship between the lag angular value δb at which the power generator 100 can produce the maximum efficiency when the rate of power generation is greater than or equal to A and the rotational speed n is measured in advance and stored in the memory.

If the rate of power generation is found to be less than A at Step 1030, it is determined whether the rate of power generation is smaller than or equal to a second threshold value B (e.g., 50%) (Step 1040). If the answer is found to be NO at Step 1040, then execution returns to Step 1010. If the answer is found to be YES at Step 1040, it is determined that it is unnecessary to pass the leading phase current through the armature winding and a command for executing the control of setting the lag angular value δ to 0, i.e., the non-leading phase current control (see FIG. 5) under interrupt control is issued (Step 1050).

Thus, when the amount of power to be generated is slightly low according to the rate of power generation indicative of a status quantity of power generation, the leading phase current can be controlled in a mode in which the power generator 100 generates power with high efficiency. When the amount of power to be generated still is low, the non-leading-phase current control can be executed in a high-output power generation mode.

Figure 15:
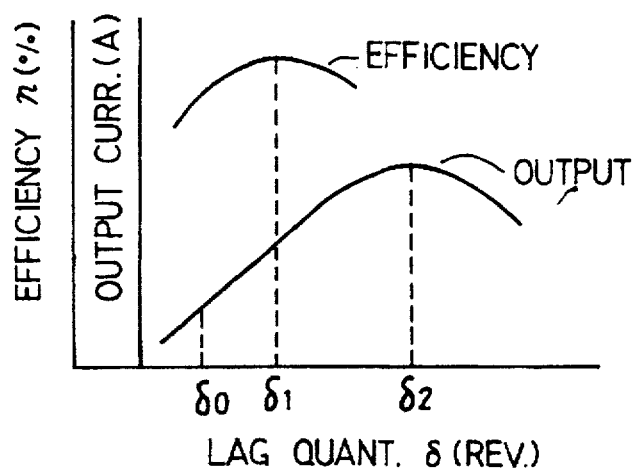
FIG. 15 is a characteristic diagram illustrating the relationship between the delay phase-angle value δ and efficiency and the output all obtained in the first embodiment at the time of control of a leading phase current.

As shown in FIG. 15, the amount of leading phase current (lag angular value δa in the present embodiment) corresponding to the maximum efficiency, which is obtained at an arbitrary rotational speed, is commonly smaller than the amount of leading phase current (lag angular value δb in the present embodiment) corresponding to the maximum output.

The aforementioned embodiment shows the case where the rate of power generation has been adopted as the quantity of state of power generation indicative of the state of power generation. However, other electrical quantities of states such as a field current, a battery voltage, a generated voltage, a load voltage, a generated current, a ripple ratio, etc. may be used as an alternative to the above. Namely, if the field current and the generated current exceed a first threshold value in their increasing directions, then the state of power shortage or the state of need for an increase in power generated can be determined. If the battery voltage, the generated voltage and the load voltage exceed the first threshold value in their decreasing directions, then the state of power shortage or the state of need for the increase in power generated can be determined. If the ripple ratio, i.e., the rate of change in the output current or output voltage of the power generator 100, exceeds the first threshold value in its increasing direction, then the state of power shortage or the state of need for the increase in power generated can be determined.

Further, if the field current and the generated current exceed a second threshold value smaller than the first threshold value in their decreasing directions, then the state of power shortage is resolved and the passage of leading phase current through the armature winding is allowed to stop without hunting. If the battery voltage, the generated voltage and the load voltage exceed a second threshold value larger than the first threshold value in their increasing directions, it is then possible to resolve the state of power shortage and stop the passage of leading phase current therethrough without hunting. If the ripple ratio, i.e., the change in output current or output voltage of the power generator 100 exceeds the second threshold value which is smaller than the first threshold value in its decreasing direction, it is then possible to resolve the state of high ripple and stop the passage of leading phase current therethrough without hunting.

Velocity status quantities related to the rotational speed of the power generator 100 such as the rotational speed of the power generator 100 or the engine 1, a vehicle speed, etc., which are used in place of the electrical status quantities described above, may be used as the quantity of state of power generation in place of the rate of power generation to execute the aforementioned leading-phase current control.

Namely, since the voltage generated from and current outputted from the generator 100 greatly increase as the rotational speed thereof increases, no problem occurs even if there is no power shortage if the rotational speed n of the power generator, the engine speed and the vehicle speed exceed the second threshold value in their increasing directions. It is therefore possible to stop the passage of leading phase current through the armature winding. On the other hand, when the rotational speed n of the power generator, the engine speed and the vehicle speed exceed the first threshold value which is smaller than the second threshold value in their decreasing directions, the possibility of a power shortage is determined and a command for passing the leading phase current through the armature winding is issued.

Figure 16:
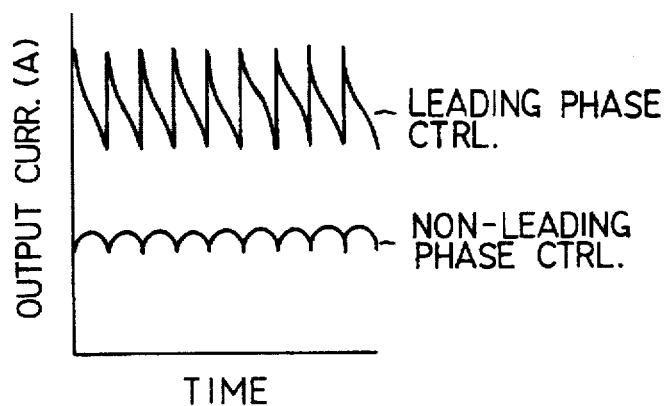
FIG. 16 is a timing chart for describing variations in output current obtained in the first embodiment at the time of control of the leading and non-leading phase currents.

Thus, no leading phase current is supplied to its corresponding armature winding in a high rotational range in which the passage of leading phase current therethrough is unnecessary. The ripple ratio of the output current in the high rotational range can be reduced and the shortage of output can be resolved in a low rotational range. A comparison between the rate of change in output current (ripple) at the time that the lag angular value $\delta$ is 0 (at the time of the non-leading phase control) and the rate of change in output current (ripple) at the time of the leading phase control will be shown in FIG. 16. A problem arises that the ripple increases upon passage of the leading phase current through the armature winding.

Incidentally, the leading phase current may flow through the armature winding only when both the velocity status quantities and the electrical status quantities require the passage of leading phase current therethrough. Alternatively, the leading phase current may be supplied to the armature winding unconditionally at low rpm and the leading phase current may be supplied thereto at high rpm only when the electrical status quantities require the passage of leading phase current therethrough. For example, detection is made as to whether the rotational speed n of the power generator is less than or equal to 2000 rpm. Based on the result of detection, the control for generating the leading phase current is performed. Further, the leading phase current can be supplied at 2000–5000 rpm only when the electrical status quantities require an increase in output. Furthermore, the leading phase current can be caused to stop flowing at 5000 rpm or more.

Figure 17:
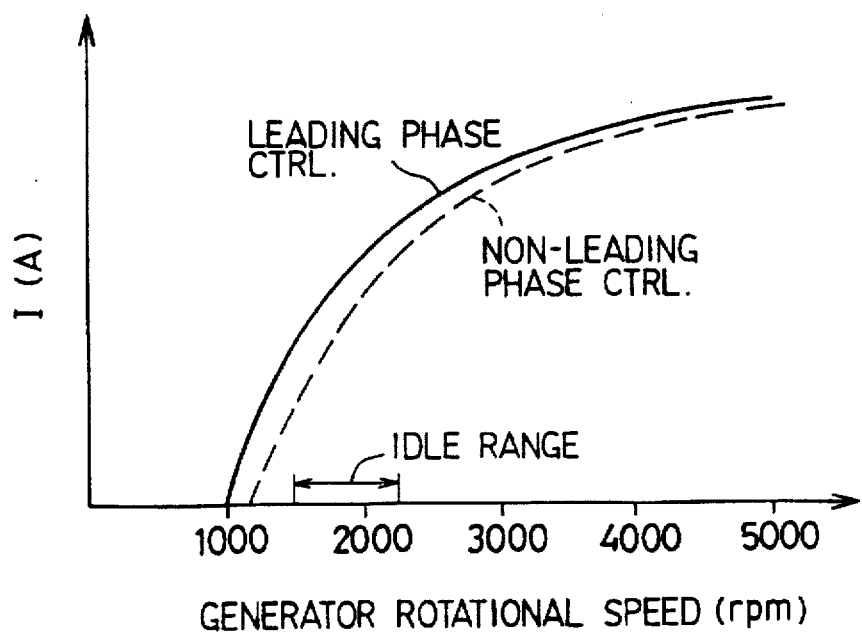
FIG. 17 is a characteristic diagram showing the relationship between the output current and the rotational speed of a generator both obtained in the first embodiment at the time of control of the leading and non-leading phase currents.

FIG. 17 shows the relationship between the output currents at the time of the supply of the leading phase current and the non-leading phase current and the rotational speed n of the power generator. The effect of increasing the output according to the passage of the leading phase current through the corresponding armature winding is particularly significant at low rpm but is low at high rpm.

In the aforementioned embodiment, the binary control of the supply of the leading phase current has been executed. It is, however, needless to say that the amount of passage of the leading phase current through the corresponding armature winding may be increased in place of the supply of the leading phase current and the amount of passage of the leading phase current therethrough may be reduced in place of non-supply of the leading phase current.

Owing to the construction and operation described above, the above control on normal use can provide an improvement in gas mileage for the vehicle and prevention of the charging of the battery from shortage by holding the generated output as a power source in high quality in a reduced state of the ripple of the generated output and generating high-efficiency and high output power when the output of the power generator is low.

Since the output at low rpm under which the output is apt to be low can be increased owing to the supply of the leading phase current, the power generator can be reduced in size and weight correspondingly. The effect of reducing idle speed and thereby improving the gas mileage can be also achieved in the same structure.

One example for performing the control for the passage of leading phase current through its corresponding armature winding at idle speed in a fifth embodiment will now be described with reference to FIG. 18.

Figure 14:
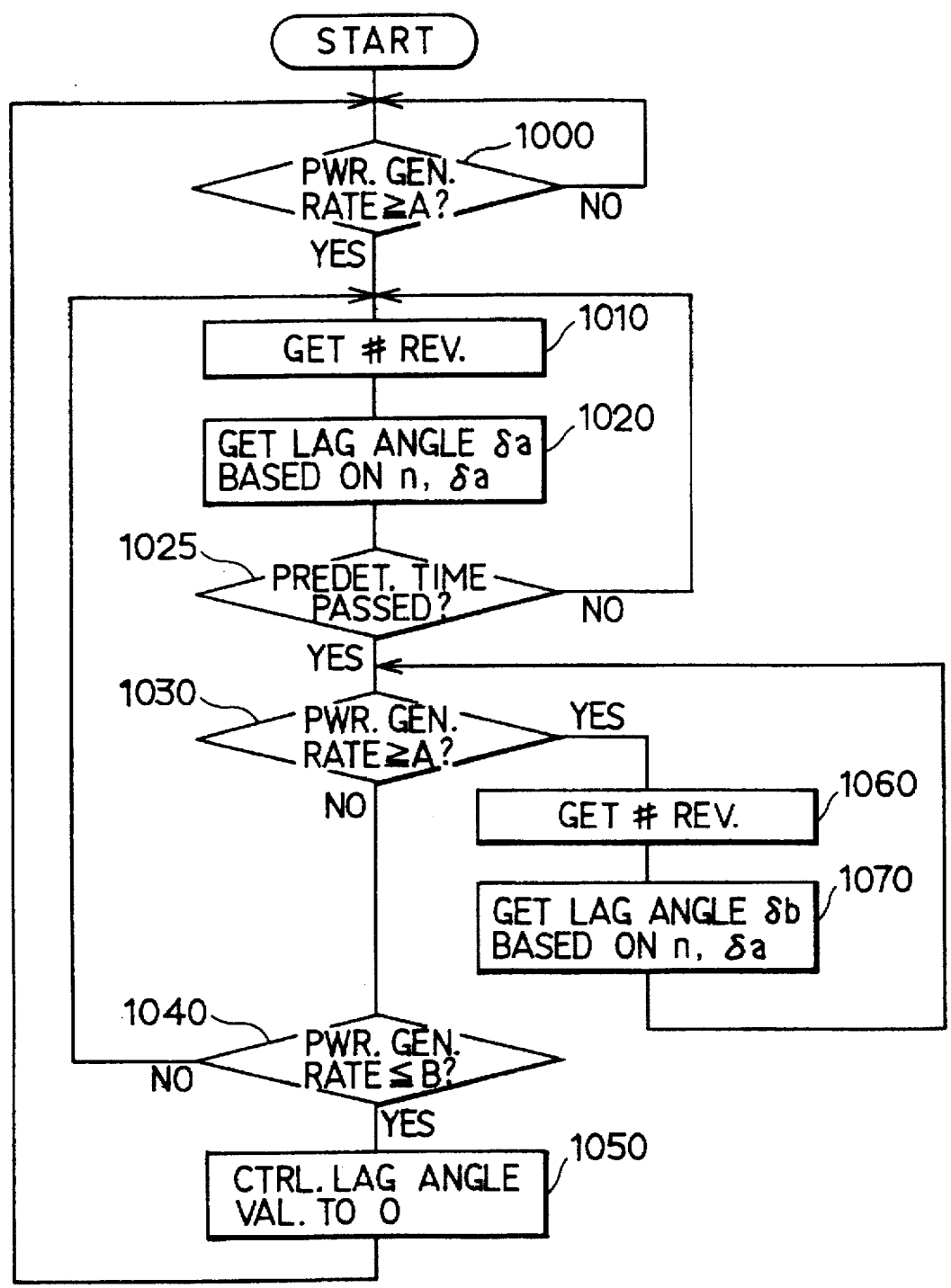
FIG. 14 is a flowchart for describing the control operation of the first embodiment of a vehicle power generating system of the present invention.

In the present embodiment, Step 2020 is executed as an alternative to Steps 1010 and 1020 in the flowchart of FIG. 14 illustrative of the fourth embodiment. Further, Step 2070 is executed as an alternative to Steps 1060 and 1070.

Namely, at Step 2020, a lag angular value $\delta$ is fixed to a lag angular value $\delta c$ equivalent to the amount of passage of leading phase current through its corresponding armature winding, which provides the maximum efficiency of the power generator 100 at a predetermined idle speed regardless of an actual rotational speed. At Step 2070, the lag angular value $\delta$ is fixed to a lag angular value $\delta d$ equivalent to the amount of passage of leading phase current through its corresponding armature winding, which provides the maximum output of the power generator 100 at the predetermined idle speed regardless of the actual rotational speed.

Thus, the leading phase current for providing the maximum output can be supplied when an increase in output is strongly required at idle speed under which the most need of the supply of the leading phase current occurs. Further, the leading phase current can be supplied with high efficiency when a slight increase in output is required but the supply of the maximum output is not required at idle speed under which the greatest need of the supply of the leading phase current occurs. Furthermore, when the increase in output according to the supply of the leading phase current is not required, its supply can be canceled. Since the effect of increasing the output owing to the supply of the leading phase current at non-idle is small, a great advantageous effect can be ensured by doing so even though the control is simple.

Similarly, a lag angular value $\delta$ at a vehicle normal rotational speed can be set to the best efficiency value or the maximum output value as an alternative to the lag angular value $\delta$ at idle speed. In doing so, the efficiency of the power generator can be improved relative to the rotational speed most used while the vehicle is running, thereby making it possible to bring about the effect of improving gas mileage of the vehicle.

Another example for performing the control for the supply of the leading phase current at idle speed in a sixth embodiment will now be described with reference to FIG. 19.

Figure 18:
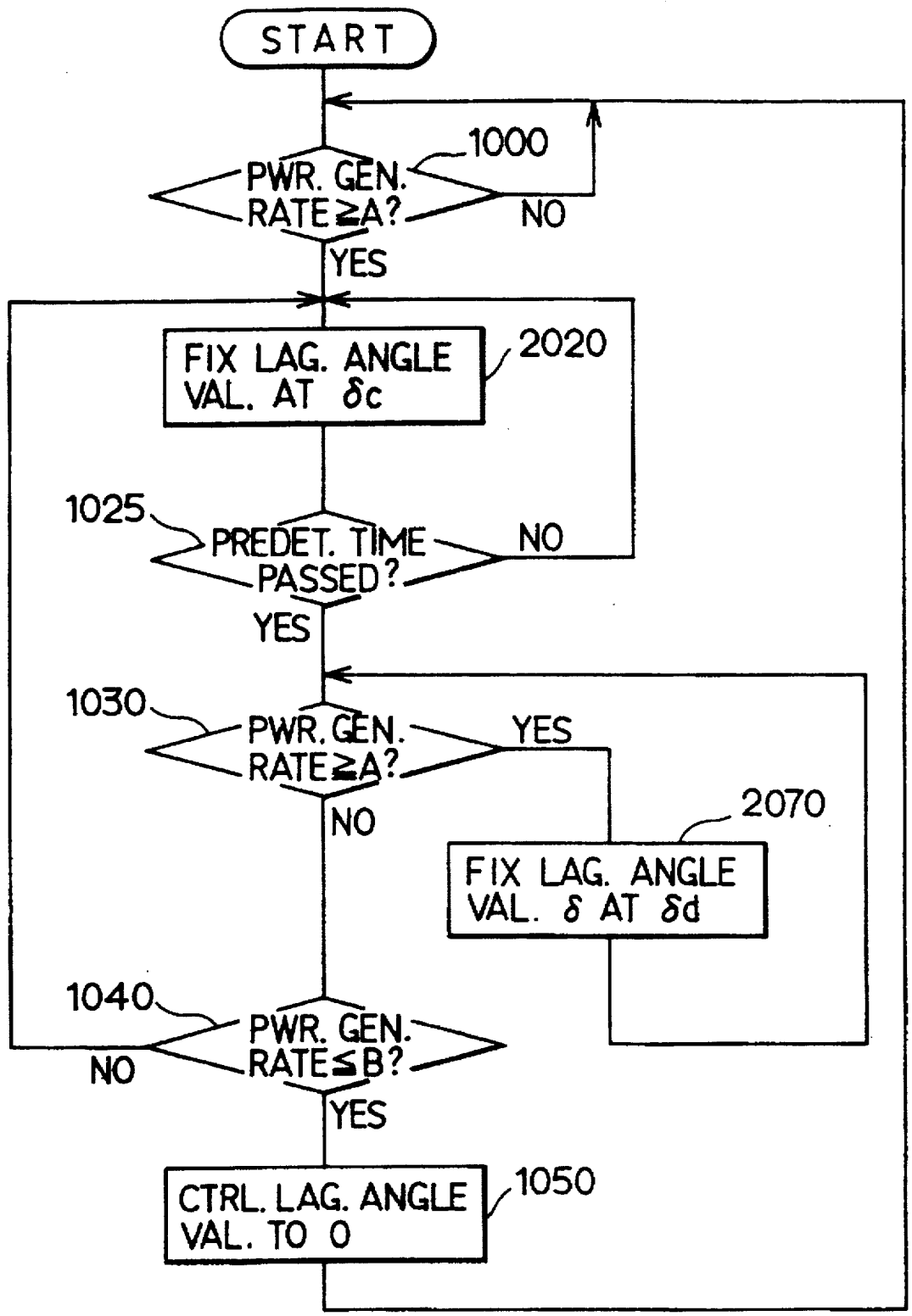
FIG. 18 is a flowchart for describing the control operation of the second embodiment.

In the present embodiment, Step 990 for making a decision as to whether the vehicle is at idle is provided before Step 1000 in the flowchart shown in FIG. 18 illustrative of the embodiment 2. Incidentally, the idling is determined by an ECU 2 based on the degree of opening of a throttle, the rotational speed and a vehicle speed.

In the present embodiment, the supply of the leading phase current is intermittently controlled based on the result of decision with both the rotational speed of the engine corresponding to the velocity status quantity and the rate of power generation corresponding to the electrical status quantity as the quantities of state of power generation. The supply of the leading phase current is controlled according to the rate of power generation particularly only when the rotational speed of the engine is determined as the idle speed. If so, then the leading phase current can be provided only when the rate of power generation is high at idle speed under which the most need of the supply of the leading phase current takes place, i.e., the power to be generated is low. Further, the leading phase current for providing the maximum output can be supplied when an increase in output is strongly required. Furthermore, the leading phase current can be supplied with the maximum efficiency when a slight increase in output is required but the supply of the maximum output is not required at idle speed under which the greatest need of the supply of the leading phase current occurs.

The rotational speed of the engine is detected based on a pulse signal outputted from the turning-angle sensor 16. If the detected rotational speed falls within a predetermined range of low rotational speed, then the rotational speed may be determined as being indicative of idle in the present embodiment. As an alternative to the rotational speed n of the power generator referred to above, the vehicle speed, the rotational speed of the engine, etc. may be used as the velocity status quantities. If a vehicle speed sensor outputs a vehicle speed 0, for example, then the engine can be determined as idle. When the rotational speed of the engine is below 800 rpm, the engine is determined to be at idle and execution proceeds to Step 1000. When the rotational speed of the engine increases above 2000 rpm, the supply of the leading phase current may be stopped. Further, the control for supplying the leading phase current can be executed regarding the rotational speed of the power generator as low and the output generated therefrom as small when the vehicle speed is below 5 km/hour. If the vehicle speed is above 20 km/hour, then the control for the supply of the leading phase current can be stopped with the rotational speed n of the power generator regarded as high and the output generated therefrom regarded as sufficiently large.

In the aforementioned embodiments, the controller 7 includes a microprocessor. In this condition, each individual flowchart has been executed. It is however needless to say that the aforementioned flowcharts can be carried out by the ECU 2.

Figure 20:
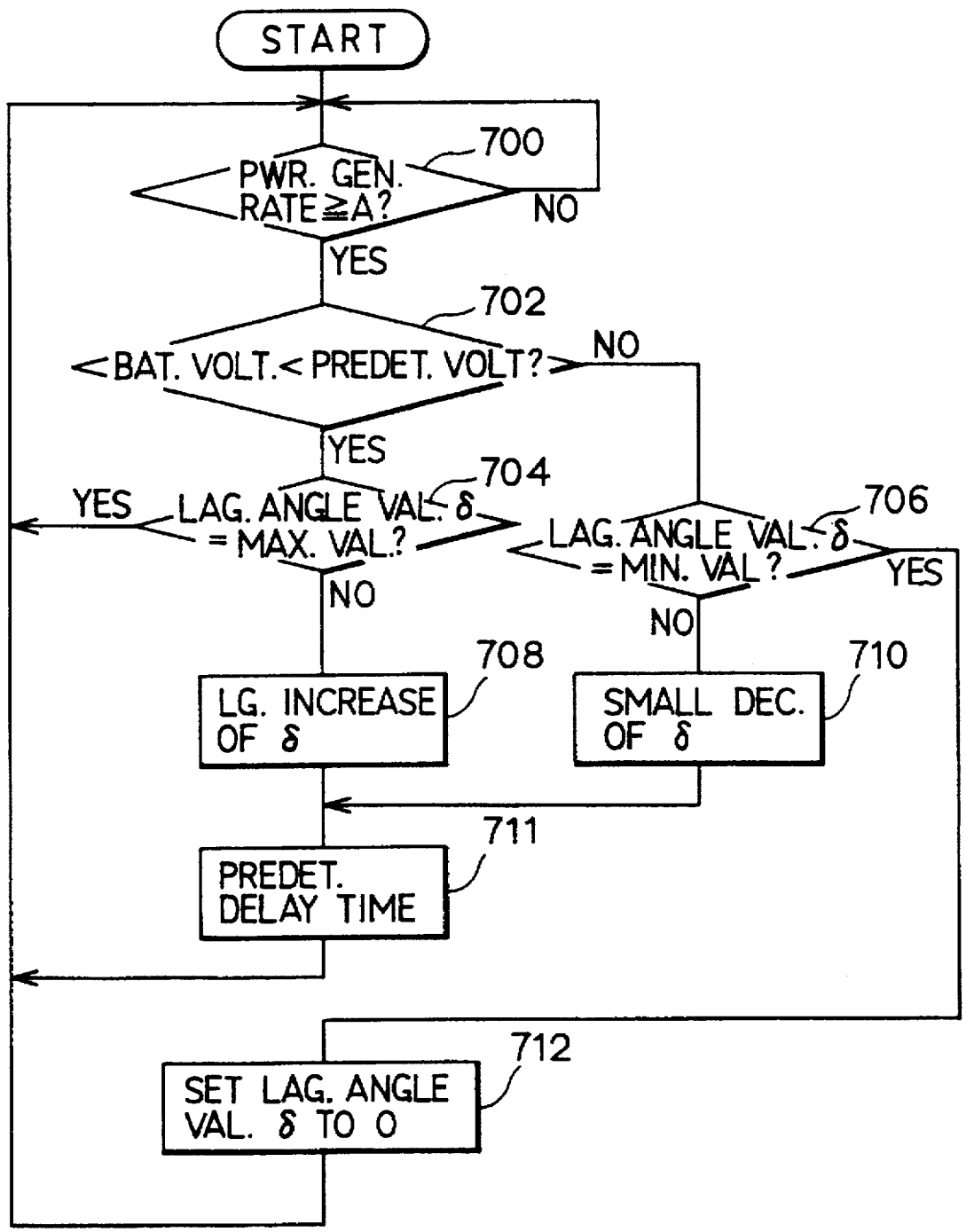
FIG. 20 is a flowchart for describing the control operation of the fourth embodiment.

A seventh embodiment for performing control over a leading phase current with a battery voltage equivalent to an electrical status quantity as the quantity of state of power generation will be described with reference to a flowchart shown in FIG. 20.

The controller first waits until the rate of power generation reaches a predetermined value (95% or more in the present embodiment) (Step 700). If the answer is found to be YES at Step 700, it is then checked whether a battery voltage VB is less than a predetermined adjusted voltage Vref (Step 702). If the answer is found to be NO at Step 702, it is then checked whether a lag angular value δ is equal to the minimum value δmin (corresponding to a value near 0 in the present embodiment) (Step 706). If the answer is found to be YES at Step 706, then the lag angular value δ is set to 0 determining the supply of the leading phase current as unnecessary (Step 712). Thereafter, execution returns to Step 700. If the answer is found to be NO at Step 706, then a value obtained by subtracting only a predetermined small value from the previous value of the lag angular value δ is set as the present value of the lag angular value δ (Step 710). After a predetermined time has been delayed (Step 711), execution returns to Step 700. On the other hand, if the battery voltage VB is greater than the predetermined adjusted voltage Vref at Step 702, it is then checked whether the lag angular value δ is the maximum value δmax. If the answer is found to be YES at Step 704, then execution returns to Step 700. If the answer is found to be NO at Step 704, then a value obtained by adding a predetermined small value to the previous value of the lag angular value δ is set as the present value of the lag angular value δ (Step 708). After a predetermined time has been delayed (Step 711), execution returns to Step 700. The delay of the predetermined time at Step 711 is made for suppressing a routine cyclic speed thereby to prevent the rate of increase in the lag angular value δ at Step 708 and the rate of decrease in the lag angular value δ at Step 710 from excessively speeding up.

In the present embodiment, if the value stored in the register of CPU provided in the controller 7 for storing the lag angular value δ is 0, then the control for the supply of a non-leading phase current is executed in accordance with an interrupt routine executed at predetermined time intervals. If the value stored in the register is not 0, then the control for the supply of the leading phase current is executed in accordance with the interrupt routine executed at predetermined time intervals.

Namely, in the present embodiment, the leading phase current is controlled to cause the battery voltage VB to coincide with the adjusted voltage Vref where there is a possibility that the rate of power generation becomes greater than a predetermined value and the shortage of power generation occurs in the case of simple control on a field current.

In the aforementioned embodiment, the maximum value δmax of the lag angular value δ is set to the lag angular value δ2 for generating the maximum output shown in FIG. 15. The minimum value δmin of the lag angular value δ is set to the lag angular value δ0 shown in FIG. 15.

Since the maximum value of the rate of change in the lag angular value δ is controlled to be the predetermined value or less at Steps 708, 710 and 711 in the present embodiment (i.e., the lag angular value gradually varies), a sudden shock to the engine load by the supply of the leading phase current can be lightened.

The effect of gradually changing the lag angular value will be described with reference to FIGS. 21A–21C. If the load for the power generator suddenly increases and the battery voltage is lowered, then the engine load is simply increased gradually owing to the effect of gradually increasing the lag angular value δ at Steps 708 and 711 under the leading-phase current control when the rate of power generation suddenly increases due to the conventional field current control or the lag angular value δ suddenly increases upon control of the leading phase current. It is therefore possible to prevent the rotational speed of the engine from suddenly decreasing. Since the leading phase current gradually increases even when the rate of power generation is 100%, the rotational speed of the engine can be prevented from suddenly decreasing. In the present embodiment, a predetermined initial value is set to the above register for storing the lag angular value δ therein at the time of initial reset after power-on. Incidentally, as an alternative to the reduction in the battery voltage, a reduction in the rotational speed of the power generator from a predetermined value may be detected to gradually change the lag angular value and supply the current. The aforementioned gradual change is made to control the maximum value (variation speed) of the rate of change in the lag angular value δ to the predetermined value or lees. The lag angular value δ shows a leading-phase current supplying or carrying period. A description for gradually changing the lag angular value δ based on the turning-angle sensor has been made for simplicity as the leading-phase current control system. As a result, the leading phase current that leads the phase voltage by the lag angular value δ in phase is supplied. Thus, even if the phase period of each of the phase voltage and the phase current is detected and the control for the supply of the leading phase current is performed so that the maximum value of the rate of change in the detected phase period is constrained to a predetermined value or less, the same advantageous effect as described above can be obtained by additionally providing the decision on the zero-crossing point of the phase voltage in addition to the decision on the zero-crossing point of the armature current as in the fifth embodiment of the present invention.

Even if the values of leading phase currents that flow during the leading-phase current carrying period are detected to calculate the average value of the detected values and the maximum value of the rate of change in the calculated average value is controlled to be a predetermined value or less, the same advantageous effect as described above can be obtained. Further, even if the period or cycle of the armature current is detected so that the maximum value of a leading-phase current carrying period (i.e., the period for supplying the leading phase current) is decided from the detected period and each of the constants and variables related to the angles employed in the present embodiment (Steps 704, 746, 708, 710 and 712) is used by being replaced with the leading-phase current carrying period, the same advantageous effect as described above can be obtained. Namely, the above effect of gradually changing the lag angular value can be obtained by adding or subtracting a predetermined small proportion to or from an initial value (e.g., 1%) of a proportion of the leading-phase current carrying period per period of the armature current according to the battery voltage and controlling the maximum value of the rate of change in that proportion to a predetermined value or less.

Figure 22:
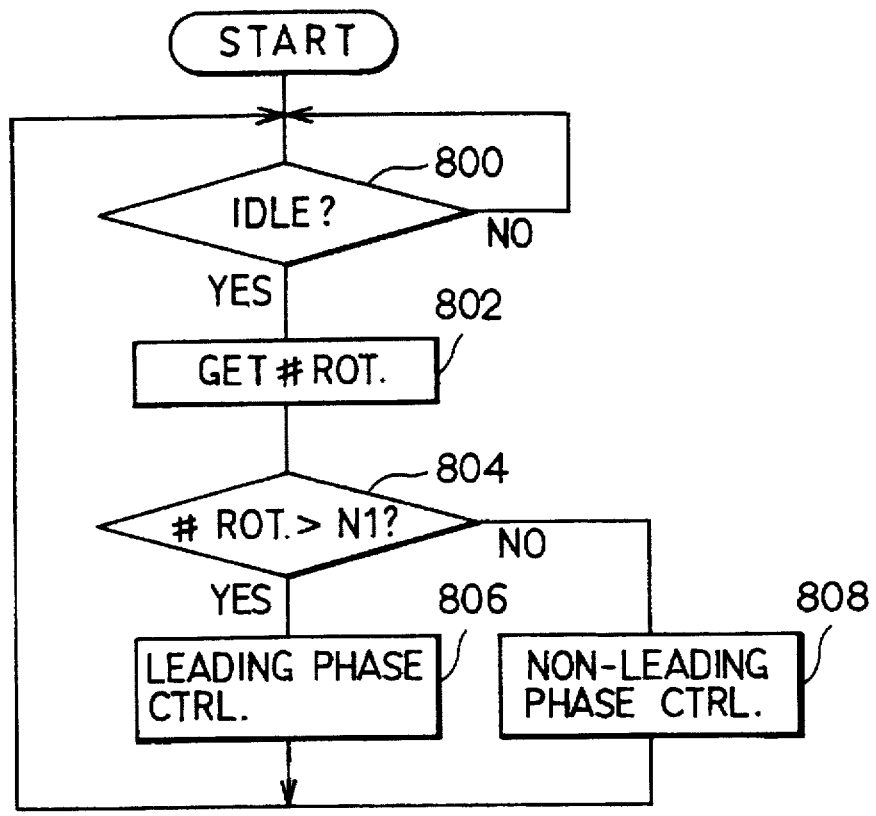
FIG. 22 is a flowchart for describing the control operation of the fourth embodiment.

The operation for reducing a periodic variation (i.e., ripple) in the rotational speed of the engine under the aforementioned leading-phase current control in an eighth preferred embodiment of the present invention will now be described with reference to a flowchart shown in FIG. 22.

Figure 19:
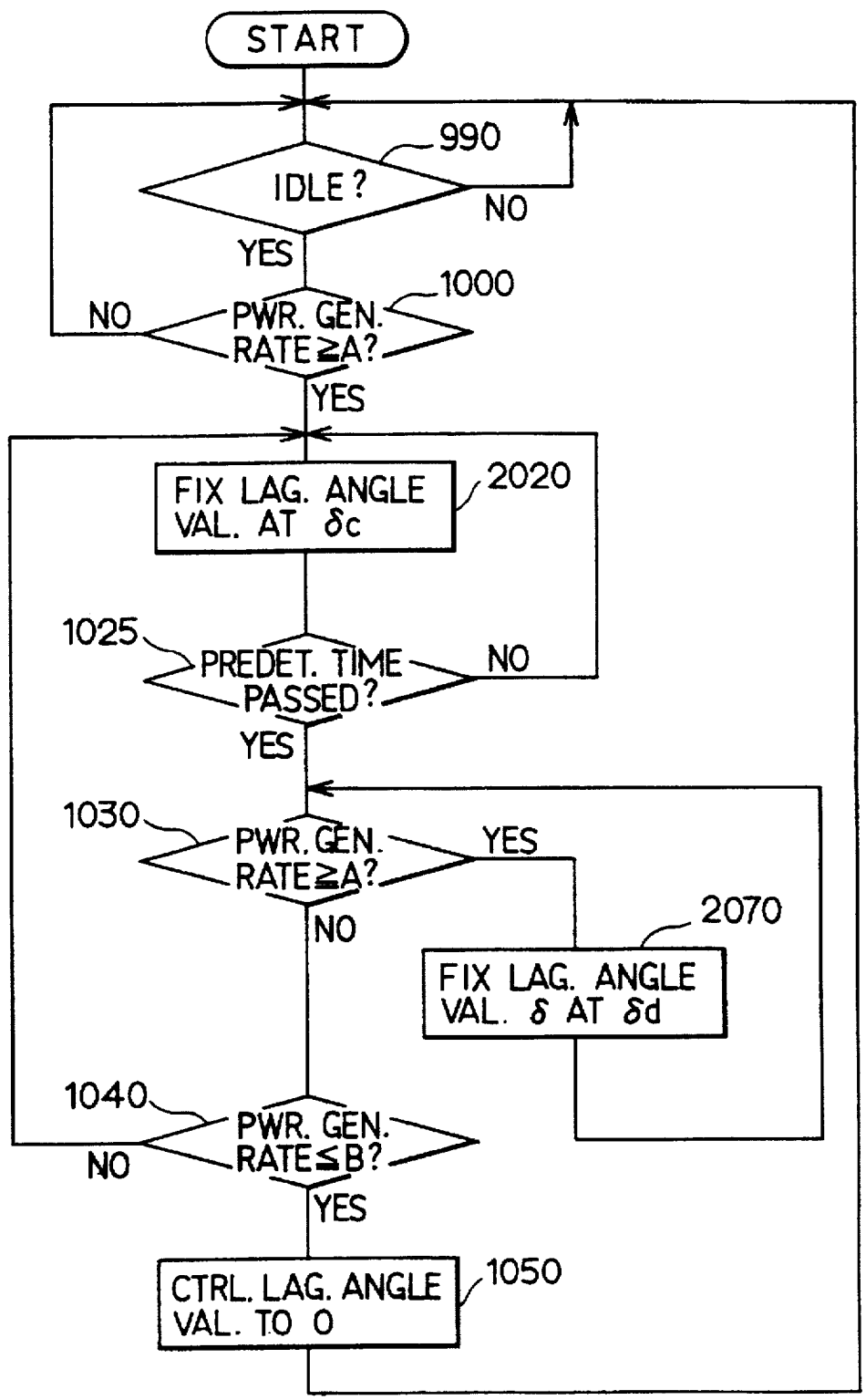
FIG. 19 is a flowchart for describing the control operation of the third embodiment.

Since the aforementioned ripple is sensitive at idle in particular, it is first checked based on a system or mode the same as that at Step 990 in FIG. 19 whether the engine is at idle (Step 800). If the answer is found to be NO at Step 800, then execution returns to Step 800. If the answer is found to be YES at Step 800, then the rotational speed of the engine is detected (Step 804). It is next checked whether the detected rotational speed of the engine is smaller than a predetermined rotational speed N1 (Step 804). If the answer is found to be YES at Step 804, then a leading-phase current carrying or supplying mode (see FIGS. 6A and 7, for example) is selected to increase an engine load (Step 806). If the answer is found to be NO at Step 804, then a non-leading phase current supplying mode (see FIG. 5, for example) is selected to decrease the engine load (Step 808).

Figure 23:
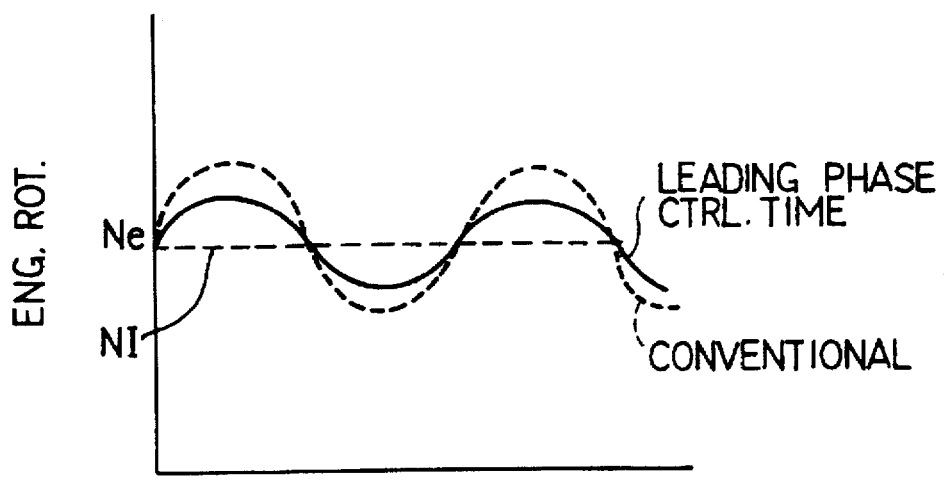
FIG. 23 is a timing chart for describing effects obtained in a fifth embodiment according to the present invention.

In doing so, the periodic variation (i.e., ripple) in the rotational speed of the engine can be reduced. FIG. 23 is a timing chart for describing the effect of reducing the periodic variations (i.e., ripples) in the rotational speed of the engine at the time of the supply (indicated by the solid line) of the leading phase current and the non-supply (indicated by the broken line) of the leading phase current. If the average rotational speed of the engine at idle is regarded as Nm (600 rpm in the present embodiment), it is then preferable that the aforementioned predetermined rotational speed N1 is Nm, preferably, a value (e.g., 590 rpm) slightly smaller than Nm. In the present embodiment, the lag angular value δ is kept constant.

Figure 24:
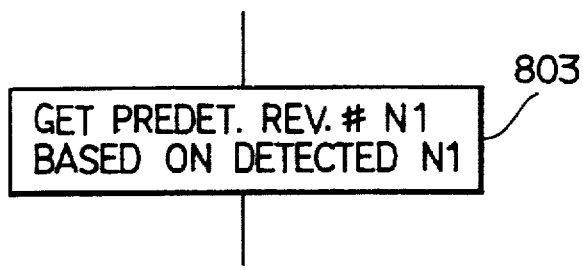
FIG. 24 is a flowchart for describing a modification of the fifth embodiment.

Incidentally, the predetermined rotational speed N1 can be corrected according to the magnitude of the variation (ripple) in the rotational speed of the engine. Namely, when the variation in the rotational speed of the engine is large, the predetermined rotational speed N1 is set to a value substantially equal to the average rotational speed Nm (600 rpm in the present embodiment) to increase engine load torque in the form of the phase opposite to that of the variation in the rotational speed of the engine. On the other hand, when the rotational speed of the engine is low, the predetermined rotational speed N1 is set to a value sufficiently smaller than the average rotational speed Nm (600 rpm in the present embodiment) so that the amount of increase in the engine load torque having the phase opposite to that of the variation in the rotational speed of the engine is reduced. One example of this processing will be shown in a flowchart of FIG. 24. This flowchart is equivalent to one in which Step 803 is additionally provided between Steps 802 and 804 in FIG. 21. The present Step 803 corresponds to a step for reading a predetermined rotational speed N1 corresponding to the detected rotational speed of the engine from the memory in the controller 7 based on the detected rotational speed of the engine. Incidentally, the relationship between the two has been stored in the memory in advance. In doing so, the amount of the supply of the leading phase current can be adjusted according to the ripple. Thus, when the ripple is small, it is possible to prevent the risk of increasing the ripple by the supply of a leading phase current having an opposite phase.

Incidentally, the control for the amount of supply of the leading phase current permits an adjustment to the lag angular value δ even if the proportion of the leading-phase current carrying period per each period of the phase current is changed, as well as an adjustment to the leading-phase current carrying period at each period of the phase current, i.e., the lag angular value δ.

In the aforementioned embodiment, the variation in the rotational speed due to the supply of the leading phase current has been suppressed depending on whether the rotational speed of the engine is greater than the predetermined rotational speed N1. However, the rotational speed of the engine may be suppressed when the rate (the amount of change in the rotational speed/the average rotational speed) of change in the rotational speed of the engine during a predetermined period exceeds a predetermined level. Further, if the leading phase current is being supplied when the rotational speed of the engine falls into the idling engine speed range, then the supply of the leading phase current may be stopped to suppress the stoppage of the engine.

Figure 25:
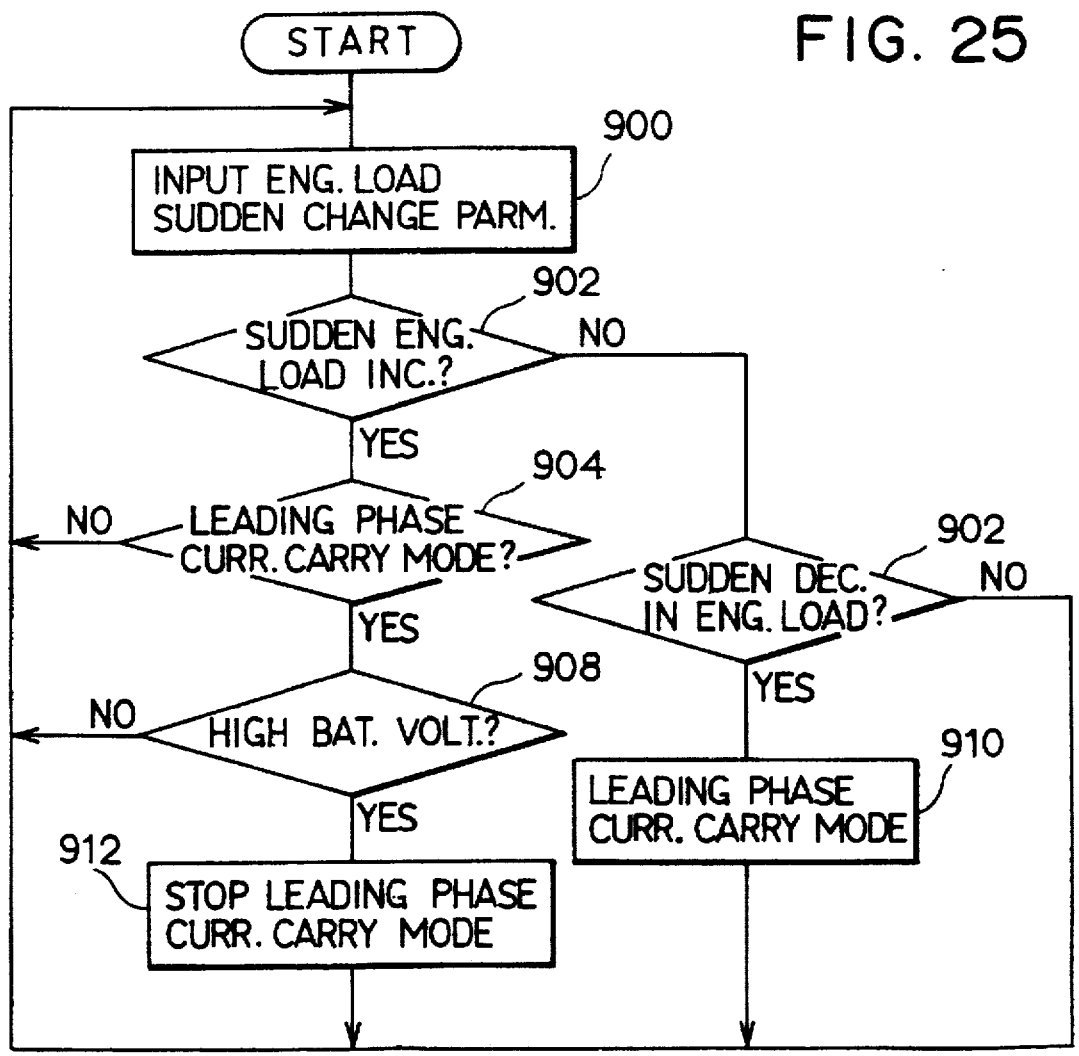
FIG. 25 is a flowchart for describing the control operation of a sixth embodiment according to the present invention.

Another control example for preventing the rotational speed of the engine from suddenly decreasing under the control of the leading phase current in a ninth preferred embodiment of the present invention will now be described with reference to FIG. 25.

A quantity of state, which varies in relation to a sudden change in engine load is first inputted (Step 900). It is checked whether the engine load abruptly increases based on the variation in the quantity of state (Step 902). If the answer is found to be YES at Step 902, it is then checked whether the control is in a leading-phase current carrying mode (Step 904). If the answer is found to NO at Step 904, it is then checked whether the engine load is abruptly reduced (Step 906).

For the quantity of state which varies in relation to the sudden change in engine load, a load current, a battery voltage, the rate of power generation, the state of opening and closing of a switch for controlling the application of power to an electrical load, the state of opening and closing of a switch for applying power to a mechanical load such as a compressor or the like can be adopted. It is apparent that these status quantities can be detected by the controller 7 or the ECU 2.

If the answer is found to be NO at Step 906, then execution returns to Step 900. If the answer is found to be YES at Step 906, then a command for supplying the leading phase current is issued (Step 910). Thereafter, execution returns to Step 900. If the answer is found to be NO at Step 904, then execution returns to Step 900. If the answer is found to be YES at Step 904, then a check is made to see if the battery voltage is greater than a predetermined minimum value and the allowance for the capacity of the battery is provided (Step 908). If the battery voltage is low and no allowance for the capacity of the battery is given, then execution returns to Step 900. If the battery voltage is high and its allowance is given, then the leading-phase current carrying mode is stopped (Step 912) and execution returns to Step 900.

Figure 21A:
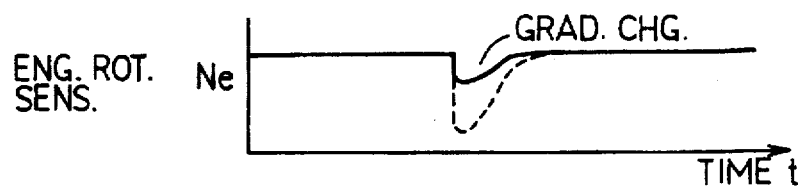
FIGS. 21A–21C are timing charts for explaining effects obtained in the fourth embodiment.
Figure 21B:
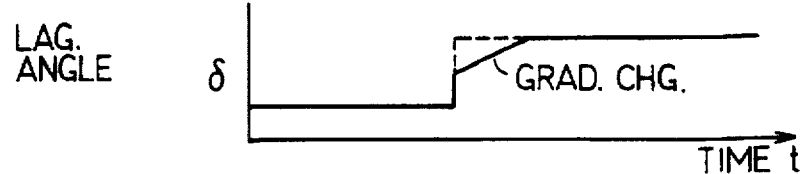
Figure 21C:
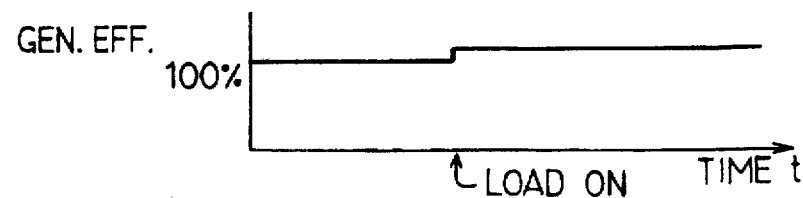

It is thus possible to prevent the rotational speed of the engine from suddenly changing due to the sudden change in the load of the power generator as shown in FIGS. 21A–21C.

Incidentally, the leading-phase current control has a fast response compared to the field current control. Accordingly, the leading-phase current control is suitable for the control in the present embodiment.

Figure 26:
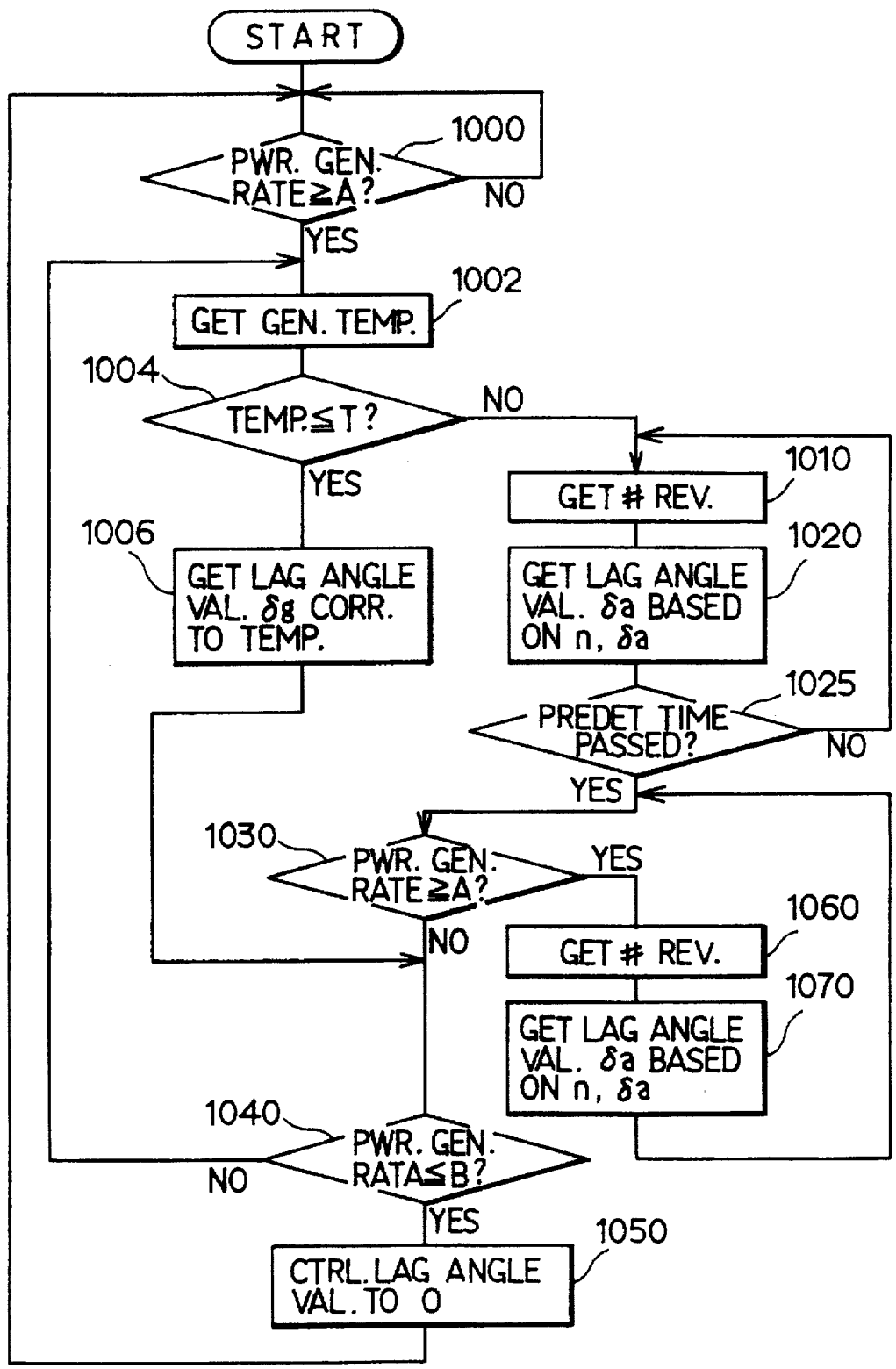
FIG. 26 is a flowchart for describing the control operation of a seventh embodiment according to the present invention.

An embodiment for performing leading-phase current control based on the temperature of the field winding 4c, each of the stator windings 5a through 5c or a predetermined portion of the power generator 100 in a tenth preferred embodiment of the present invention will now be described with reference to a flowchart shown in FIG. 26.

The present flowchart is one in which Steps 1002, 1004 and 1006 are added to the flowchart shown in FIG. 14. Only these steps will be described below. At Step 1000, the rate of power generation is compared with a predetermined value A (e.g., 95%). If the answer is found to be YES at Step 1000, then the leading-phase current control is executed since the output is potentially low. Before its control, however, the temperature of the power generator 100 is detected based on a signal produced from a temperature sensor 70 shown in FIG. 8 (Step 1002). It is already known that when the temperature of the power generator 100 is low, a field current increases.

If the detected temperature is now found to be higher than or equal to a predetermined value T (100° C., for example), then execution proceeds to Step 1010 regarding an increase in field current at the low temperature referred to above as negligible. If the detected temperature is less than or equal to T, then a lag angular value δg corresponding to the temperature is searched from a stored map and the searched lag angular value δg is set to the aforementioned register for storing the s therein (Step 1006). Thereafter, execution proceeds to Step 1040.

The above map stored in a memory shows the relationship between the pre-checked temperature and the most suitable lag angular value δg (which no produces magnetic saturation at that temperature). Namely, the lag angular value δg becomes smaller as the temperature becomes higher.

Incidentally, the temperature of the power generator 100 may be searched from a map showing the relationship between the resistance and temperature based on an electrically-detected resistance value of a connected current detection resistor for detecting the field current flowing through the field winding 4c. Since the temperature sensor 70 is unnecessary in this case, the structure can be simplified.

In doing so, the leading phase current can be reduced by the increase in field current at the low temperature even when the rate of power generation is large, i.e., the load is large. It is therefore possible to suppress an output increase and magnetic saturation beyond conventional expectations. Particularly when the engine is started or immediately after the engine has started up at a low temperature, the engine load can be prevented from being uselessly increased by the power generator 100.

In the present embodiment, the leading phase current is increased and reduced relative to the temperature. However, the startability of the engine at the low temperature can be further improved by controlling the field current to a predetermined limiting value at the low temperature and suppressing the torque of the power generator.

Figure 27:
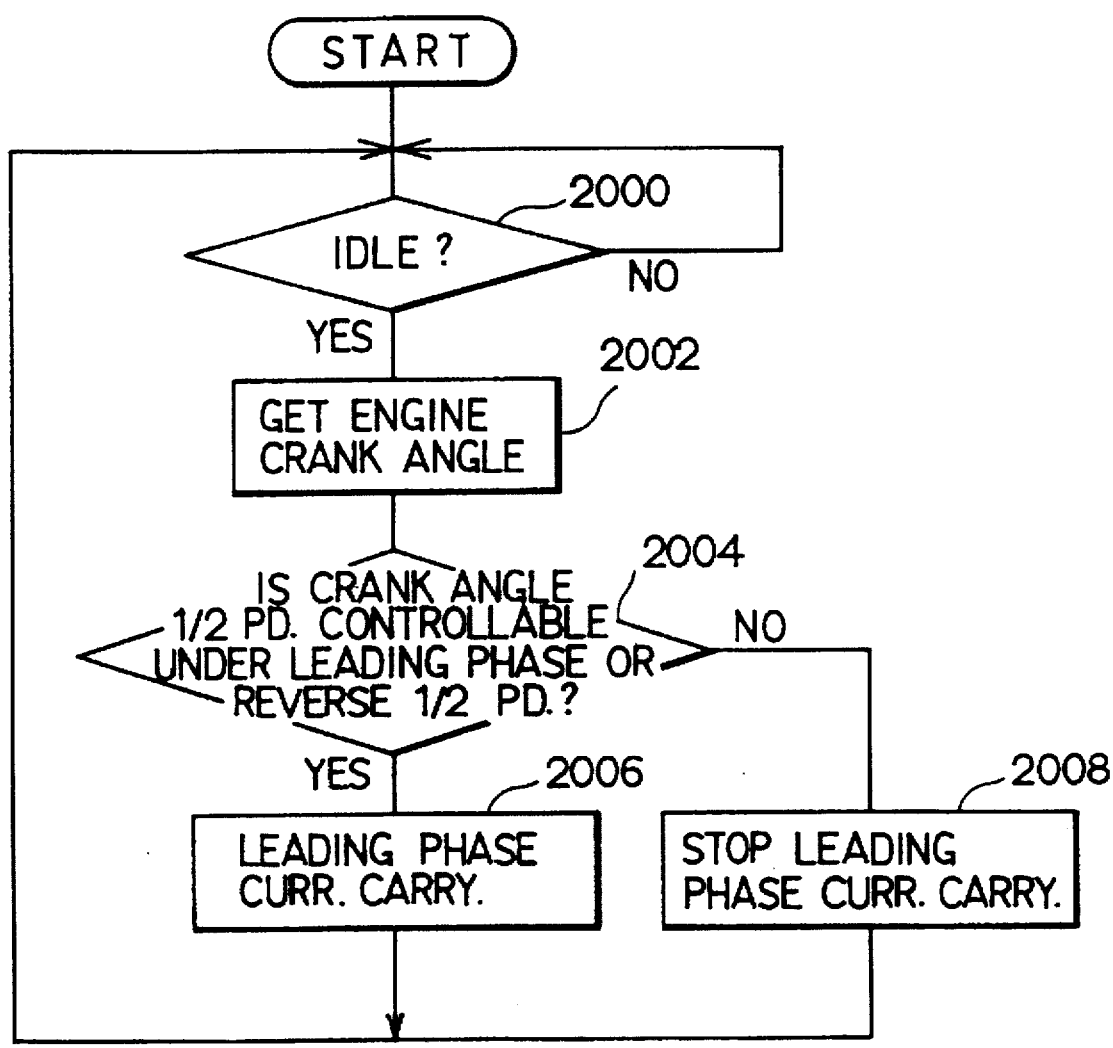
FIG. 27 is a flowchart for describing the control operation of an eighth embodiment of the present invention.

A vibration control operation for reducing the vibrations created by the engine under the control of a leading phase current in an eleventh preferred embodiment of the present invention will now be described with reference to a flowchart shown in FIG. 27. Other embodiments show applications in which the output control based on the leading-phase current control according to the present invention is high-speed as compared with the conventional output control based on the field current.

Since the vibrations created by the engine are easily sensitive at idle in particular, it is first determined based on a system or mode similar to that at Step 990 in FIG. 19 whether the engine is at idle (Step 2000). If the answer is found to be NO at Step 2000, then execution returns to Step 2000. If the answer is found to be YES at Step 2000, then a crank angle is read from an unillustrated crank angle sensor attached to the engine 1 through the ECU 2 (Step 2002).

It is next checked whether the read crank angle is a half period controllable under the supply of the leading phase current or a reverse half period (Step 2004). If the answer is found to be YES at Step 2004, then a leading-phase current supplying or carrying mode (see FIGS. 6 and 7) is selected (Step 2006). If the answer is found to be NO at Step 2004, then a leading-phase current non-carrying mode (see FIG. 5) is selected (Step 2008).

Incidentally, the engine vibrations (whose fundamental frequency components in particular) are represented in the form of a waveform obtained by combining rotational vibrations and reciprocating vibrations. However, the composite waveform has one cycle or period related to a predetermined crank angle. The rotational speed of the engine increases during a phase period (hereinafter called "speed-increasing phase period") from a predetermined crank angle θ1 to a predetermined crank angle θ2. Thus, if the engine load is rendered heavy by supplying the leading phase current during the speed-increasing phase period (which may be a half period with the speed-increasing phase period as the center), then the rotational speed of a crankshaft can be prevented from increasing and the engine vibrations related to the speed increase in the crankshaft can be suppressed.

When the power generator 100 and the engine 1 are coupled to each other by a belt, there may be a case where a torque transfer time between the two is delayed somewhat. In this case, the timing for selecting the leading-phase current carrying mode may be made fast by using the delay time.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A power generating system comprising:
   a power generator having a field winding for generating field magnetic flux and armature windings for producing power-generating outputs, said power generator for being driven by an engine;

AC-DC power converting means for rectifying a voltage outputted from each armature winding and supplying said rectified voltage to an electrical load;

field current control means for controlling a field current supplied to said field winding;

voltage control means for controlling said field current control means to control each of said power-generating outputs produced from said power generator to be a predetermined value;

power generation detecting means for detecting a predetermined quantity of power generation related to a state of power generation of said power generator;

determining means for determining, based on said detected quantity of power generation, an amount of leading phase current to be supplied to each armature winding; and leading-phase current control means for starting said supply of said leading phase current to each armature winding or increasing said supply based on said amount determined by said determining means, or stopping said supply of said leading phase current thereto or decreasing said leading phase current based on said amount determined by said determining means.

2. A power generating system according to claim 1, further comprising a battery supplied with power from said AC-DC power converting means.

3. A power generating system according to claim 1, wherein when said quantity of power generation exceeds a predetermined first threshold value in a direction in which said supply of said leading phase current to each armature winding is necessary, said determining means is for determining said supply of said leading phase current to each armature winding as being necessary.

4. A power generating system according to claim 3, wherein when said quantity of power generation further exceeds a second threshold value exceeding said first threshold value in a direction opposite to said direction in which said supply of said leading phase current to each armature winding is necessary, said determining means is for determining said supply of said leading phase current to each armature winding as unnecessary.

5. A power generating system according to claim 1, wherein said quantity of power generation includes an electrical status quantity composed of at least one of a battery voltage, a field current, a rate of power generation, a generated voltage, a load voltage, a generated current and a ripple ratio.

6. A power generating system according to claim 1, wherein said quantity of power generation includes a velocity status quantity composed of at least one of said rotational speed of said power generator, said rotational speed of said engine and a vehicle speed.

7. A power generating system according to claim 1, wherein when said rotational speed of said engine is determined as less than a predetermined rotational speed, said determining means is for determining said engine to be at idle based on said quantity of power generation and when said engine is determined to be at idle, said determining means is for determining said supply of said leading phase current to each armature winding as being necessary.

8. A power generating system according to claim 1, further comprising detecting means for detecting a physical quantity related to said rotational speed of said power generator and wherein said leading-phase current control means is for determining timing for supplying said leading phase current to each armature winding according to said rotational speed of said power generator detected based on said physical quantity.

9. A power generating system according to claim 1, wherein said leading-phase current control means is for supplying said leading phase current to each armature winding at a leading-phase current carrying timing in which one of efficiency and output of said power generator, at a time that said rotational speed of said engine is a predetermined value, is greater than or equal to a predetermined value.

10. A power generating system according to claim 9, wherein said leading-phase current control means is for supplying said leading phase current to each armature winding at a leading-phase current carrying timing in which one of efficiency and output of said power generator, at a time that said rotational speed of said engine is a predetermined idling engine speed, is greater than or equal to said predetermined value.

11. A power generating system according to claim 1, wherein said leading-phase current control means has a high-efficiency power generation mode indicative of a leading-phase current control mode under a leading-phase current carrying condition in which efficiency of said power generator becomes greater than or equal to a predetermined value, and a high-output power generation mode indicative of said leading-phase current control mode under a leading-phase current carrying condition in which an output of said power generator becomes greater than or equal to said predetermined value, and said determining means selects one of said modes based on said quantity of power generation when said supply of said leading phase current to each armature winding is determined as being necessary.

12. A power generating system according to claim 1, wherein said quantity of power generation includes a battery voltage and said determining means determines said supply of said leading phase current to each armature winding as being necessary when said battery voltage is lower than a predetermined first voltage value and determines said leading-phase current supply as being unnecessary when said battery voltage is higher than a predetermined second voltage value including said predetermined first voltage value.

13. A power generating system according to claim 1, wherein said leading-phase current control means is for limiting a maximum value of a rate of change in leading phase current to gradually change said leading phase current.

14. A power generating system according to claim 1, wherein said leading-phase current control means is for limiting a maximum value of a rate of change in at least one of a leading-phase current carrying period, a phase of said carrying leading-phase current relative to each phase voltage and an average of said leading phase currents supplied to said armature windings thereby to gradually change said leading phase current.

15. A power generating system according to claim 14, wherein said leading-phase current control means is for restricting a maximum value of a rate of change in proportion of a leading-phase current carrying period per predetermined period in which armature currents are continuous relative to each other thereby to gradually change said leading phase current.

16. A power generating system according to claim 13, wherein said quantity of power generation includes a physical quantity related to at least one of an output voltage drop at a time of an increase in a electrical load supplied with power from said power generator and a reduction in said rotational speed of said power generator and said determining means determines said gradual change in and supply of said leading phase current as being necessary when at least one of said output voltage drop and said reduction in said rotational speed of said power generator is determined as being larger than the other based on said physical quantity.

17. A power generating system according to claim 1, wherein said quantity of power generation includes a physical quantity related to a variation in said rotational speed of said engine, said determining means is for determining said leading-phase current supply as being necessary when said variation is determined as being large based on said physical quantity and said leading-phase current control means is for suppressing said variation in said rotational speed of said engine for said supply of said leading phase current when said leading-phase current supply is determined as being necessary.

18. A power generating system according to claim 1, wherein said quantity of power generation includes a physical quantity related to vibrations created by said engine, said determining means is for determining said leading-phase current supply as being necessary when said vibrations are determined as being large based on said physical quantity and said leading-phase current control means is for suppressing said engine vibrations for said supply of said leading phase current when said leading-phase current supply is determined as being necessary.

19. A power generating system according to claim 1, wherein said quantity of power generation includes a physical quantity related to a temperature of a predetermined portion of said power generator, said determining means is for determining based on said physical quantity whether said power generator has a low temperature and said leading-phase current control means is for stopping said supply of said leading phase current to each armature winding and for reducing said leading phase current when said power generator is determined as being low in temperature and is for starting said supply of said leading phase current to each armature winding and increasing said leading phase current when said power generator is determined as being in a non-low temperature state.

20. A power generating system according to claim 1, wherein said leading-phase current control means includes an energization circuit having high side switches respectively composed of semiconductor switching devices for actuating said armature windings by individually connecting a high-potential DC power terminal and output terminals of said armature windings for respective phases and low side switches respectively composed of semiconductor switching devices for actuating said armature windings by individually connecting a low-potential DC power terminal set to a potential lower than that at said high-potential DC power terminal and said output terminals of said armature windings, and a controller for controlling said energization circuit.

21. A power generating system according to claim 20, further including detecting means for detecting a difference in potential between at least one of said high-potential DC power terminal and said low-potential DC power terminal of said AC-DC power converting means and said output terminal of each armature winding and at least one of said armature currents and wherein said leading-phase current control means is for setting timing for opening and closing each semiconductor switching device based on at least one of said potential difference and said at least one armature current.

22. A power generating system according to claim 20, wherein said controller is for turning off each high side switch after a predetermined period has elapsed since a potential at said output terminal of each armature winding has become less than a potential at said high-potential DC power terminal and is for turning off each low side switch after a predetermined period has elapsed since said potential at said output terminal of each armature winding has become greater than a potential at said low-potential DC power terminal.

23. A power generating system according to claim 20, wherein said controller is for turning on each high side switch after a predetermined period has elapsed since said potential at said output terminal of each armature winding has become greater than said potential at said low-potential DC power terminal and is for turning on each low side switch after a predetermined period has elapsed since said potential at said output terminal of each armature winding has become less than said potential at said high-potential DC power terminal.

24. A power generating system according to claim 20, further including phase angle detecting means for detecting a rotational phase angle of a rotor of said power generator and wherein said leading-phase current control means is for controlling timing at actuation of each semiconductor switching device based on said rotational phase angle.

25. A power generating system according to claim 20, wherein each semiconductor switching device comprises a MOSFET.

26. A power generating system according to claim 25, wherein said MOSFET is composed of SiC.

27. A power generating system according to claim 1, wherein said leading-phase current control means includes a short-circuiting circuit composed of a plurality of semiconductor switching devices for short-circuiting between output terminals of said armature windings for respective phases and a controller for controlling opening and closing of each semiconductor switching device.

28. A power generating system according to claim 27, wherein each semiconductor switching device incorporates therein a current detection resistive element for detecting said armature current.

29. A power generating system according to claim 27, wherein said controller is for turning on said semiconductor switching devices of said short-circuiting circuit to allow said leading phase current to flow in each armature winding after said potential at said output terminal of each armature winding has become less than said potential at said high-potential DC power terminal, is for turning on said semiconductor switching devices of said short-circuiting circuit to allow said leading phase current to flow out from each armature winding after said potential at said output terminal of each armature winding has become greater than said potential at said low-potential DC power terminal and is for turning off said semiconductor switching devices of said short-circuiting circuit after a predetermined time has elapsed since said turning-on.

30. A power generating system comprising:
a power generator having a field winding for generating field magnetic flux and armature windings for producing power-generating outputs, said power generator for being driven by an engine;
field current control means for controlling a field current supplied to said field winding;
voltage control means for controlling said field current control means to control each of said power-generating outputs produced from said power generator to a predetermined value; and
leading-phase current control means for supplying a leading phase current to each armature winding, said leading-phase current control means being for controlling and limiting a maximum value of a rate of change in leading phase current to gradually change said leading phase current.

31. A power generating system comprising:

a power generator having a field winding for generating field magnetic flux and armature windings for producing power-generating outputs, said power generator for being driven by an engine;

field current control means for controlling a field current supplied to said field winding;

voltage control means for controlling said field current control means to control each of said power-generating outputs produced from said power generator to be a predetermined value;

detecting means for detecting a physical quantity related to a variation in a rotational speed of said engine;

leading-phase current control means for supplying a leading phase current to each armature winding and for controlling said supply of said leading phase current to each armature winding; and determining means for determining a magnitude of a variation in said rotational speed of said engine based on said physical quantity;

whereby said leading-phase current control means is for supplying said leading phase current to each armature winding when said leading phase current is effective to suppress changes in said engine rotational speed based on generator driving torque.

32. A power generating system comprising:

a power generator having a field winding for generating field magnetic flux and armature windings for producing power-generating outputs, said power generator for being driven by an engine;

field current control means for controlling a field current supplied to said field winding;

voltage control means for controlling said field current control means to control each of said power-generating outputs produced from said power generator to a predetermined value;

detecting means for detecting a physical quantity related to vibrations created by said engine;

leading-phase current control means for supplying a leading phase current to each armature winding and for controlling said supply of said leading phase current to each armature winding; and determining means for determining a magnitude of said engine vibrations based on said physical quantity;

whereby said leading-phase current control means supplies said leading phase current to each armature winding when said leading phase current is effective to suppress changes in said engine vibrations based on generator driving torque.

33. A power generating system comprising:

a power generator having a field winding for generating field magnetic flux and armature windings for producing power-generating outputs, said power generator for being driven by an engine;

field current control means for controlling a field current supplied to said field winding;

voltage control means for controlling said field current control means to control each of said power-generating outputs produced from said power generator to be a predetermined value;

detecting means for detecting a physical quantity related to a temperature of a predetermined portion of said power generator;

leading-phase current control means for supplying a leading phase current to each armature winding and for controlling said supply of said leading phase current to each armature winding; and determining means for determining based on said physical quantity whether said power generator is at a predetermined temperature range;

whereby said leading-phase current control means is for stopping said supply of said leading phase current to each armature winding and reducing said leading phase current when said power generator is determined as being in said predetermined temperature range and is for starting said supply of said leading phase current to each armature winding and increasing said leading phase current when said power generator is determined as being outside said predetermined temperature range.

* * * * *